(12) United States Patent
Crinon et al.

(10) Patent No.: US 7,924,921 B2
(45) Date of Patent: *Apr. 12, 2011

(54) SIGNALING CODING AND DISPLAY OPTIONS IN ENTRY POINT HEADERS

(75) Inventors: Regis J. Crinon, Camas, WA (US); Chih-Lung Lin, Redmond, WA (US); Jie Liang, Coquitlam (CA); Shankar Regunathan, Bellevue, WA (US); Shuo-Jen Wu, Redmond, WA (US); Timothy E. Onders, Kirkland, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1320 days.

This patent is subject to a terminal disclaimer.

(21) Appl. No.: 10/989,845

(22) Filed: Nov. 15, 2004

(65) Prior Publication Data

US 2005/0123274 A1      Jun. 9, 2005

Related U.S. Application Data

(63) Continuation-in-part of application No. 10/882,739, filed on Jun. 30, 2004, application No. 10/989,845, which is a continuation-in-part of application No. 10/934,116, filed on Sep. 4, 2004.

(60) Provisional application No. 60/520,543, filed on Nov. 13, 2003, provisional application No. 60/501,081, filed on Sep. 7, 2003.

(51) Int. Cl.
H04N 11/04 (2006.01)
H04N 7/48 (2006.01)
H04N 7/50 (2006.01)
H04N 11/24 (2006.01)

(52) U.S. Cl. .............................. 375/240.16; 375/240.22

(58) Field of Classification Search ............. 375/240.16, 375/240

See application file for complete search history.

(56) References Cited

U.S. PATENT DOCUMENTS 4,847,877 A     7/1989   Besseyre (Continued)

FOREIGN PATENT DOCUMENTS

CA            2257577         10/1998

(Continued)

OTHER PUBLICATIONS

ITU-T Recommendation H.263: "Video coding for low bit rate communication", Feb. 1998.*

(Continued)

*Primary Examiner* — Joseph G Ustaris
*Assistant Examiner* — David N Werner
(74) *Attorney, Agent, or Firm* — Klarquist Sparkman, LLP

(57) ABSTRACT

A decoder receives an entry point header comprising plural control parameters for an entry point segment corresponding to the entry point header. The entry point header is in an entry point layer of a bitstream comprising plural layers. The decoder decodes the entry point header. The plural control parameters can include various combinations of control parameters such as a pan scan on/off parameter, a reference frame distance on/off parameter, a loop filtering on/off parameter, a fast chroma motion compensation on/off parameter, an extended range motion vector on/off parameter, a variable sized transform on/off parameter, an overlapped transform on/off parameter, a quantization decision parameter, and an extended differential motion vector coding on/off parameter, a broken link parameter, a closed entry parameter, one or more coded picture size parameters, one or more range mapping parameters, a hypothetical reference decoder buffer parameter, and/or other parameter(s).

21 Claims, 18 Drawing Sheets

U.S. PATENT DOCUMENTS

| | | | |
|---|---|---|---|
| 4,969,055 A | 11/1990 | Oberjatzas et al. | |
| 5,023,727 A | 6/1991 | Boyd et al. | |
| 5,027,206 A | 6/1991 | Vreeswijk et al. | |
| 5,168,356 A | 12/1992 | Acampora et al. | |
| 5,175,618 A | 12/1992 | Ueda et al. | |
| 5,191,436 A | 3/1993 | Yonemitsu | |
| 5,212,549 A * | 5/1993 | Ng et al. | 375/240.15 |
| 5,223,949 A | 6/1993 | Honjo | |
| 5,293,229 A | 3/1994 | Iu | |
| 5,325,126 A * | 6/1994 | Keith | 375/240.12 |
| 5,365,552 A | 11/1994 | Astle | |
| 5,428,396 A * | 6/1995 | Yagasaki et al. | 375/240.16 |
| 5,477,397 A | 12/1995 | Naimpally et al. | |
| 5,543,847 A | 8/1996 | Kato | |
| 5,586,200 A | 12/1996 | Devaney et al. | |
| 5,602,956 A | 2/1997 | Suzuki et al. | |
| 5,621,840 A | 4/1997 | Kawamura et al. | |
| 5,661,665 A | 8/1997 | Glass et al. | |
| 5,740,310 A | 4/1998 | De Haan et al. | |
| 5,784,528 A * | 7/1998 | Yamane et al. | 386/112 |
| 5,835,636 A | 11/1998 | Auld | |
| 5,838,823 A * | 11/1998 | Ancessi | 382/232 |
| 5,838,872 A | 11/1998 | Kawara | |
| RE36,015 E | 12/1998 | Iu | |
| 5,864,368 A | 1/1999 | Kato et al. | |
| 5,870,444 A | 2/1999 | Mynett et al. | |
| 5,898,897 A | 4/1999 | Son et al. | |
| 5,912,709 A | 6/1999 | Takahashi | |
| 5,946,043 A | 8/1999 | Lee et al. | |
| 5,955,977 A | 9/1999 | Lei | |
| 5,956,090 A | 9/1999 | Yamauchi | |
| 5,959,796 A | 9/1999 | Matsumi et al. | |
| 5,970,173 A | 10/1999 | Lee et al. | |
| 5,973,743 A | 10/1999 | Han | |
| RE36,507 E | 1/2000 | Iu | |
| 6,018,765 A | 1/2000 | Durana et al. | |
| 6,061,399 A | 5/2000 | Lyons et al. | |
| 6,075,576 A | 6/2000 | Tan et al. | |
| 6,169,573 B1 | 1/2001 | Sampath-Kumar et al. | |
| 6,188,428 B1 | 2/2001 | Koz | |
| 6,198,773 B1 | 3/2001 | Gill et al. | |
| 6,201,927 B1 | 3/2001 | Comer | |
| RE37,222 E | 6/2001 | Yonemitsu et al. | |
| 6,266,158 B1 | 7/2001 | Hata et al. | |
| 6,301,428 B1 | 10/2001 | Linzer | |
| 6,320,907 B1 * | 11/2001 | Pau et al. | 375/240.22 |
| 6,330,214 B1 | 12/2001 | Ohta et al. | |
| 6,380,991 B1 | 4/2002 | Teichmer | |
| 6,414,998 B1 | 7/2002 | Yoshinari et al. | |
| 6,415,326 B1 | 7/2002 | Gupta et al. | |
| 6,434,195 B1 | 8/2002 | Luthra et al. | |
| 6,442,604 B2 | 8/2002 | Romine | |
| 6,453,115 B1 | 9/2002 | Boyle | |
| 6,470,135 B1 | 10/2002 | Kim et al. | |
| 6,493,392 B1 * | 12/2002 | Chung et al. | 375/240.27 |
| 6,499,060 B1 | 12/2002 | Wang et al. | |
| 6,512,882 B1 | 1/2003 | Teunissen | |
| 6,529,555 B1 | 3/2003 | Saunders et al. | |
| 6,532,333 B1 | 3/2003 | Ito | |
| 6,567,471 B1 | 5/2003 | Yoshinari | |
| 6,584,273 B1 | 6/2003 | Ashley et al. | |
| 6,611,624 B1 | 8/2003 | Zhang et al. | |
| 6,728,317 B1 | 4/2004 | Demos | |
| 6,735,253 B1 | 5/2004 | Chang et al. | |
| 6,765,963 B2 | 7/2004 | Karczewicz et al. | |
| 6,823,010 B1 | 11/2004 | Curet et al. | |
| 6,873,629 B2 | 3/2005 | Morris | |
| 6,912,251 B1 | 6/2005 | Ward et al. | |
| 6,920,175 B2 | 7/2005 | Karczewicz et al. | |
| 6,985,188 B1 | 1/2006 | Hurst, Jr. | |
| 7,027,509 B2 | 4/2006 | Jun et al. | |
| 7,116,831 B2 * | 10/2006 | Mukerjee et al. | 382/236 |
| 7,164,844 B1 | 1/2007 | Yap et al. | |
| 7,177,522 B2 | 2/2007 | MacInnis | |
| 7,242,716 B2 | 7/2007 | Koto et al. | |
| 7,599,435 B2 * | 10/2009 | Marpe et al. | 375/240.16 |
| 7,609,762 B2 | 10/2009 | Crinon et al. | |
| 2002/0041628 A1 | 4/2002 | Andersson et al. | |
| 2002/0061183 A1 | 5/2002 | MacInnis | |
| 2002/0163532 A1 | 11/2002 | Thomas et al. | |
| 2003/0053416 A1 | 3/2003 | Ribas-Corbera et al. | |
| 2003/0156640 A1 | 8/2003 | Sullivan | |
| 2003/0194010 A1 * | 10/2003 | Mukerjee et al. | 375/240.16 |
| 2003/0231863 A1 | 12/2003 | Eerenberg et al. | |
| 2004/0190770 A1 * | 9/2004 | Spaulding et al. | 382/167 |
| 2004/0264578 A1 | 12/2004 | Soroushian | |
| 2005/0099869 A1 | 5/2005 | Crinon et al. | |
| 2005/0105883 A1 | 5/2005 | Holcomb et al. | |
| 2005/0111547 A1 * | 5/2005 | Holcomb et al. | 375/240.03 |
| 2005/0135783 A1 | 6/2005 | Crinon et al. | |
| 2005/0152448 A1 | 7/2005 | Crinon et al. | |
| 2006/0013568 A1 | 1/2006 | Rodriguez | |
| 2006/0018381 A1 * | 1/2006 | Luo et al. | 375/240.16 |

FOREIGN PATENT DOCUMENTS

| | | |
|---|---|---|
| EP | 0 886 398 | 12/1998 |
| EP | 0 948 214 | 10/1999 |
| EP | 1 018 840 | 7/2000 |
| EP | 1 043 892 | 10/2000 |
| EP | 1 069 777 | 1/2001 |
| EP | 1 079 631 | 2/2001 |
| EP | 1 111 932 | 6/2001 |
| WO | WO 99/27713 | 6/1999 |
| WO | WO 99/56472 | 11/1999 |
| WO | WO 00 56077 | 9/2000 |
| WO | WO 00 64186 | 10/2000 |
| WO | WO 01 35650 A1 * | 5/2001 |

OTHER PUBLICATIONS

Anonymous, "DivX Multi Standard Video Encoder," 2 pp. (Downloaded from the World Wide Web on Jan. 24, 2006).

Wien, "Variable Block-Size Transforms for Hybrid Video Coding," Dissertation, 182 pp. (Feb. 2004).

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

U.S. Appl. No. 60/501,133, filed Sep. 7, 2003, Srinivasan et al.

ISO/IEC, "ISO/IEC 13818-2: Information Technology—Generic Coding of Moving Pictures and Associated Audio Information: Video—Amendment 1: Content Description Data," 23 pp. (Document dated Dec. 2001).

Joint Video Team of ISO/IEC MPEG and ITU-T VCEG, "Study of Final Committee Draft of Joint Video Specification (ITU-T Rec. H.264, ISO/IEC 14496-10 AVC," 257 pp. (Document dated Dec. 2002) [Downloaded from the World Wide Web on May 6, 2005].

Joint Video Team of ISO/IEC MPEG and ITU-T VCEG, "Joint Model No. 1, Revision 1 (JM-1r1)," 80 pp. (Document dated Jan. 2002) [Downloaded from the World Wide Web on May 6, 2005].

Miranda Technologies, Inc., "TCP-101i: Time Code Processor and Remote Control Panel," 1 p. (Downloaded from the World Wide Web on Oct. 22, 2005).

Reader, "History of MPEG Video Compression—Ver. 4.0," 99 pp., document marked Dec. 16, 2003.

Stockhammer et al., "H.26L/JVT Coding Network Abstraction Layer and IP-based Transport," *Proc. 2002 Int'l Conf. on Image Processing: ICIP 2002*, pp. 485-88 (Sep. 2002).

Sullivan, "Header-Level Needs for H.26L," ITU-T, Study Group 16, Questions 15/16, 6 pp. (Dec. 2001).

Sun, H., et al., "Architectures for MPEG Compressed Bitstream Scaling," *IEEE Transactions on Circuits and Systems for Video Technology*, vol. 6, No. 2, pp. 191-199 (Apr. 1996).

Suzuki et al., "Tool to Support Random Access," ITU-T, Study Group 16, Question 6, 3 pp. (Document dated Dec. 2001) [Downloaded from the World Wide Web on May 6, 2005].

Suzuki et al., "Group of Pictures for JVT Codec," ITU-T, Study Group 16, Question 6, 4 pp. (Document dated Jan. 2002) [Downloaded from the World Wide Web on May 6, 2005].

Suzuki, "AHG Report: GOP Syntax," ITU-T, Study Group 16, Question 6, 1 p. (Document dated Dec. 2002) [Downloaded from the World Wide Web on May 6, 2005].

Printouts of FTP directories from http://ftp3.itu.ch, 8 pp. (downloaded from the World Wide Web on Sep. 20, 2005.).

"Packetized Elementary Stream Headers," 3 pp. (Downloaded from the World Wide Web on Apr. 7, 2008).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at *p* x 64 kbits," 28 pp. (1993).

ITU-T, "ITU-T Recommendation H.262: Information Technology—Generic Coding of Moving Pictures and Associated Audio Information: Videol," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

ISO/IEC, "ISO/IEC 13818-6: Information Technology—Generic Coding of Moving Pictures and Associated Audio Information—Part 6: Extensions for DSM-CC," pp. ii-9, 136-147, 204, 205, 222-224, 279-290, 311-318, 399-401 (1998).

ISO/IEC, "ISO/IEC 13818-1: Information Technology—Generic Coding of Moving Pictures and Associated Audio Information: Systems," 174 pp., (2000).

ISO/IEC, "ISO/IEC 13818-4: Information Technology—Generic Coding of Moving Pictures and Associated Audio Information—Part 4: Conformance testing," 79 pp. (1998).

ISO/IEC, "DSM-CC FAQ Version 1.0," 12 pp. (1997) [Downloaded from the World Wide Web on Nov. 12, 2004].

Schwalb, "iTV Food Chain," *Prentice Hall Professional Technical Reference*, 16 pp. (Oct. 2003) [Downloaded from the World Wide Web on Nov. 12, 2004].

Andersen, "A Proposed Method for Creating VCR Functions using MPEG Streams," *Proc. 12th Int'l Conf. on Data Engineering (ICDE)*, pp. 380-382 (Feb. 1996).

ISO/IEC, Draft ISO/IEC 11172-2, "Coding of Moving Pictures and Associated Audio for Digital Storage Media at up to About 1.5 Mbit/s," Part 2: Video, 111 pp. (Nov. 1991).

ISO/IEC, "ISO/IEC 11172-2: Information Technology—Coding of Moving Pictures and Associated Audio for Storage Media at up to About 1,5 Mbit/s," 122 pp. (Aug. 1993).

ISO/IEC, "ISO/IEC 13818-6: Information Technology—Generic Coding of Moving Pictures and Associated Audio Information—Part 6: Extensions for DSM-CC," pp. ii-9, 136-147, 204, 205, 222-224, 279-290, 311-318, 399-401 (Sep. 1998).

ISO/IEC, "ISO/IEC 13818-4: Information Technologyh—Generic Coding of Moving Pictures and Associatged Audio Information—Part 4: Conformance Testing," 79 pp. (Dec. 1998).

ISO/IEC, "ISO/IEC 13818-1: Information Technology—Generic Coding of Moving Pictures and Associated Audio Information: Systems," 174 pp. (Dec. 2000).

ISO/IEC, "Information Technology—Coding of Audio-Visual Objects: Visual, ISO/IEC 14496-2, Committee Draft," 330 pp. (Mar. 1998).

ITU-T, "ITU-T Recommendation H.261: Video Codec for Audiovisual Services at *p* x 64 kbits," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

ITU-T, "ITU-T Recommendation H.320: Infrastructure of Audiovisual Services: Narrow-band Vidual Telephone Systems and Terminal Equipment," 31 pp. (May 1999).

Lei, "The construction of efficient variable-length codes with clear synchronizing codewords for digital video applications," *SPIE Visual Comm. & Image Processing '91: Visual Comm.*, vol. 1605, pp. 863-873 (Nov. 1991).

Sullivan, "On Random Access and Bitstream Format for JVT Video," JVT-B063, 10 pp. (document marked Jan. 23, 2002).

Williams, "All in Good Timecode," *Adobe Magazine*, 3 pp. (month unknown, published as "Spring 1999").

* cited by examiner

Figure 1, prior art
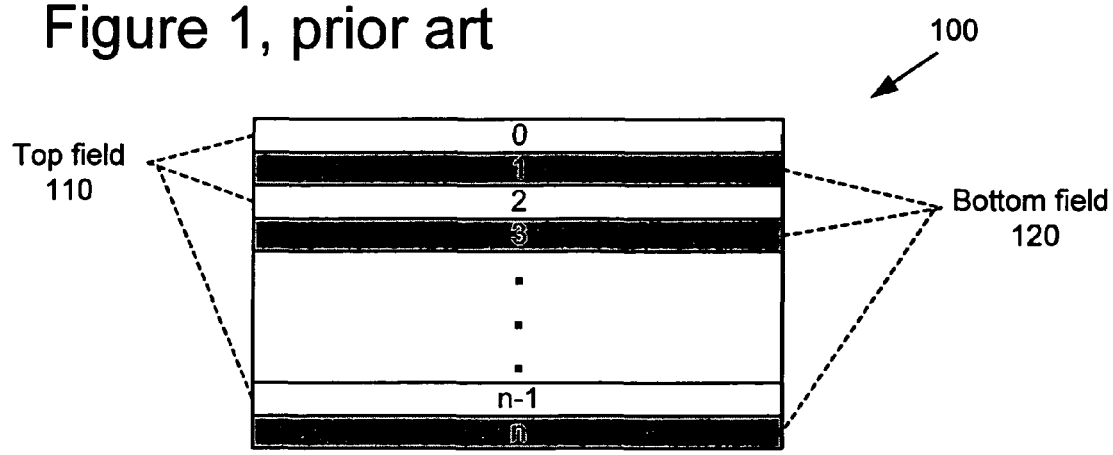
Figure 2
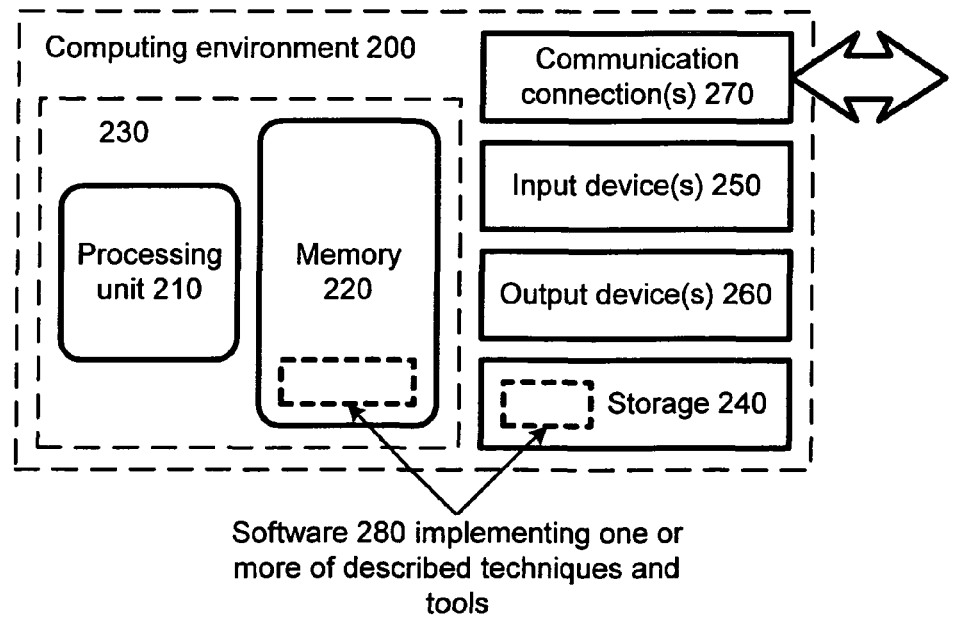

Entry Point Layer Bitstream Syntax 1600

| | Number of bits |
|---|---|
| ENTRYPOINT LAYER( ) { | |
| BROKEN_LINK | 1 |
| CLOSED_ENTRY | 1 |
| PANSCAN_FLAG | 1 |
| REFDIST_FLAG | 1 |
| LOOPFILTER | 1 |
| FASTUVMC | 1 |
| EXTENDED_MV | 1 |
| DQUANT | 2 |
| VSTRANSFORM | 1 |
| OVERLAP | 1 |
| QUANTIZER | 2 |

| | | |
|---|---|---|
| if (HRD_PARAM_ FLAG == 1) { | | |
|    hrd_fullness ( ) | | |
| } | | |
| CODED_SIZE_FLAG | 1 | |
| if (CODED_SIZE_FLAG == 1) { | | |
|    CODED_WIDTH | 12 | |
|    CODED_HEIGHT | 12 | |
| } | | |
| if (EXTENDED_MV == 1) { | | |
|    EXTENDED_DMV | 1 | |
| } | | |
| RANGE_MAPY_FLAG | 1 | |
| if (RANGE_MAPY_FLAG == 1) { | | |
|    RANGE_MAPY | 3 | |
| } | | |
| RANGE_MAPUV_FLAG | 1 | |
| if (RANGE_MAPUV_FLAG == 1) { | | |
|    RANGE_MAPUV | 3 | |
| } | | |
| } | | |

SIGNALING CODING AND DISPLAY OPTIONS IN ENTRY POINT HEADERS

RELATED APPLICATION INFORMATION

This application is a continuation-in-part of U.S. patent application Ser. No. 10/882,739, filed Jun. 30, 2004, which claims the benefit of U.S. Provisional Patent Application Ser. No. 60/520,543, filed Nov. 13, 2003, the disclosures of which are incorporated herein by reference.

This application is also a continuation-in-part of U.S. patent application Ser. No. 10/934,116, filed Sep. 4, 2004, which claims the benefit of U.S. Provisional Patent Application Ser. No. 60/501,081, filed Sep. 7, 2003, the disclosures of which are incorporated herein by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

Techniques and tools for processing digital video are described. For example, a video encoder and decoder use described techniques and tools for signaling control parameters in an entry point layer of a video bitstream.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel as a set of three samples totaling 24 bits, although pixels of greater color depth can be represented by samples totaling 48 bits or more. Thus, the number of bits per second, or bit rate, of a typical raw digital video sequence can be 5 million bits/second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which quality of the video does not suffer but decreases in bit rate are limited by the inherent amount of variability (sometimes called entropy) of the video data. Or, compression can be lossy, in which quality of the video suffers but achievable decreases in bit rate are more dramatic. Lossy compression is often used in conjunction with lossless compression—in a system design in which the lossy compression establishes an approximation of information and lossless compression techniques are applied to represent the approximation.

In general, video compression techniques include "intra-picture" compression and "inter-picture" compression, where a picture is, for example, a progressively scanned video frame. For progressive video frames, intra-frame compression techniques compress individual frames (typically called I-frames or key frames). Inter-frame compression techniques compress frames (typically called predicted frames, P-frames, or B-frames for bi-directional prediction) with reference to preceding and/or following frames (typically called reference or anchor frames).

Encoded video bitstreams are often comprised of several syntax layers. Syntax elements that encode characteristics of a video bitstream are divided among the several layers depending on the desired scope of the characteristics. For example, a sequence layer syntax element typically applies to all pictures in a sequence, whereas a picture layer syntax element generally will affect only one corresponding picture within the sequence.

I. Interlaced Video and Progressive Video

A video frame contains lines of spatial information of a video signal. For progressive video, these lines contain samples starting from one time instant and continuing in raster scan fashion through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

The primary aspect of interlaced video is that the raster scan of an entire video frame is performed in two passes by scanning alternate lines in each pass. For example, the first scan is made up of the even lines of the frame and the second scan is made up of the odd lines of the scan. This results in each frame containing two fields representing two different time epochs. FIG. 1 shows an interlaced video frame 100 that includes top field 110 and bottom field 120. In the frame 100, the even-numbered lines (top field) are scanned starting at one time (e.g., time t), and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

II. Sequence Layer Syntax Elements in a Previous WMV Encoder and Decoder

To encode and decode certain characteristics of video sequences, a previous Windows Media Video ("WMV") encoder and decoder use sequence-layer syntax elements in the bitstream resulting from encoding a video sequence. The sequence-layer syntax elements are contained in one or more sequence header in the bitstream and represent various encoding and display decisions for the pictures in the sequence.

The sequence-layer syntax elements include an element specifying encoding profiles or methods (PROFILE), a "sprite" mode element (SPRITEMODE), an interlace coding element (INTERLACE), a frame rate element (FRAMER- ATE), a bit rate element (BITRATE), a loop filtering element (LOOPFILTER), an I-picture coding technique element (X8INTRA), a multi-resolution coding element (MULTIRES), an inverse DCT transform element (FASTTX), a sub-pixel interpolation and rounding element (FASTUVMC), a broadcast element (BROADCAST), quantization elements (DQUANT, QUANTIZER), a variable-sized transform element (VSTRANSFORM), a DCT transform table-switching element (DCTTABSWITCH), an overlapped transform element (OVERLAP), a startcode synchronization marker element (STARTCODE), a pre-processing element (PREPROC), and a B-frame counter element (NUMBFRAMES). These sequence-layer elements indicate coding decisions/settings (e.g., on/off decisions for specific tools or options) that also affect decoding.

Although these sequence-layer elements allow an encoder and decoder to make encoding and display decisions on a sequence-by-sequence basis, the placement of these elements at sequence level is unnecessarily restrictive and inflexible in many contexts. On the other hand, to vary these decisions on a picture-by-picture basis, such elements would need to be signaled at picture level, which would result in undesirable increases in coding overhead. Although several shorter sequences with individual sequence headers can be sent in a bitstream, sequence headers typically contain more information than is needed for smaller chunks of video. In addition, frequently resetting control parameters in sequence headers that could otherwise remain constant is inefficient.

III. Access Points and Trick Modes in Standards for Video Compression and Decompression Several international standards relate to video compression and decompression. These standards include the Motion Picture Experts Group ("MPEG") 1, 2, and 4 standards and the H.261, H.262 (another title for MPEG 2), H.263 and H.264 (also called JVT/AVC) standards from the International Telecommunication Union ("ITU"). These standards specify aspects of video decoders and formats for compressed video information. Directly or by implication, they also specify certain encoder details, but other encoder details are not specified. These standards use (or support the use of) different combinations of intraframe and interframe decompression and compression. In particular, some of the standards use or support the use of different access points, headers, and trick modes for decoders and/or editors.

A. Access Points

The MPEG-2/H.262 standard describes intra-coded pictures (e.g., coded I-frames) and group-of-pictures ("GOP") headers. In MPEG-2, intra-coded pictures are coded without reference to other pictures and provide access points to the coded sequence where decoding can begin. Intra-coded pictures can be used at different places in a video sequence. For example, intra-coded pictures can be inserted periodically or can be used in places such as scene changes or where motion compensation is otherwise ineffective. A coded I-frame is an I-frame picture or a pair of field pictures, where the first field picture encoded in the bitstream is an I-picture and the second field picture encoded in the bitstream is an I-picture or a P-picture. The MPEG-2 standard does not allow a coded I-frame in which the first field picture encoded in the bitstream is a P-picture and the second field picture encoded in the bitstream is an I-picture. When a coded I-frame is a pair of field pictures, and the second field picture encoded in the bitstream is a P-picture, the P-picture is motion compensated relative to the I-picture (first field picture encoded in the bitstream) in the same frame.

A GOP header is a construct in the MPEG-2 bitstream that signals the beginning of a group of pictures. Groups of pictures are typically used to signal the boundary of a set of video frames/fields all encoded with reference to the same I-frame. A GOP header is an optional header that may be signaled immediately before a coded I-frame to signal the beginning of a sequence of P and B pictures that are encoded with motion compensation relative to that I-frame. In particular, a closed GOP element indicates if the first consecutive B-pictures (if any) immediately following the coded I-frame in the bitstream (but typically preceding the coded I-frame in display order) can be reconstructed properly in the case of a random access. For such B-pictures, if a reference picture before the current coded I-frame is not available, the B-pictures cannot be reconstructed properly unless they only use backward prediction from the current coded I-frame or intra coding.

A decoder may therefore use information in a GOP header to avoid displaying B-pictures that cannot be correctly decoded. For a decoder, information in the GOP header thus indicates how the decoder can perform decoding from the GOP header, even if the GOP header is in the middle of a video sequence. For example, the closed_gop flag indicates the nature of the predictions used in the first consecutive B-pictures (if any) immediately following the first coded I-frame following the GOP header. The closed_gop flag is set to '1' to indicate that these B-pictures have been encoded using only backward prediction or intra coding. The broken_link flag is set to '1' to indicate that the first consecutive B-pictures (if any) immediately following the first coded I-frame following the GOP header may not be correctly decoded because the reference frame which is used for prediction is not available (because of the action of editing which has replaced the preceding pictures with pictures from another video sequence (e.g., a commercial)). A decoder may use this flag to avoid displaying frames that cannot be correctly decoded.

The GOP header also includes other information such as time code information and a start code called group_start_code. The GOP header start code includes a 24-bit start code prefix (23 0s followed by a 1) followed by the GOP header start code value (B8 in hexadecimal).

The MPEG-4 standard describes intra-coded video object planes ("I-VOPs") and group of video object plane ("VOP") headers. An I-VOP is a VOP coded using information only from itself. Non-intra-coded VOPs may be derived from progressive or interlaced frames. In MPEG-4, I-VOPs are coded without reference to other pictures and provide access points to the coded sequence where decoding can begin. A group of VOP header is an optional header that can be used immediately before a coded I-VOP to indicate to the decoder (e.g., via the broken_link flag) if the first consecutive B-VOPs immediately following the coded I-frame can be reconstructed properly in the case of a random access. A group of VOP header must be followed by a coded I-VOP.

A group of VOP header includes information such as the closed_gov flag, which indicates whether the first consecutive B-VOPs (if any) immediately following the first coded I-VOP after the group of VOP header have been encoded using only backward prediction or intra coding. The broken_link flag may be set to '1' to avoid displaying B-VOPs following the first I-VOP if they cannot be correctly decoded.

The group of VOP header also includes other information such as time code information and a start code. A group of VOPs start code includes a 24-bit start code prefix (23 0s followed by a 1) followed by the group of VOPs start code value (B3 in hexadecimal).

According to draft JVT-d157 of the JVT/AVC video standard, I-pictures or slices provide access points to a coded sequence where decoding can begin, and various information used in decoding is signaled in network abstraction layer ("NAL") units. A NAL unit indicates what type of data to expect in the NAL unit, followed by the data itself, interspersed with emulation prevention data. A supplemental enhancement information ("SEI") NAL unit contains one or more SEI messages. Each SEI message consists of SEI header and SEI payload. The type and size of the SEI payload are coded using an extensible syntax. The SEI payload may have an SEI payload header. For example, a payload header may indicate to which picture the particular data belongs.

Annex D of the draft JVT-d157 describes a syntax for a random access point SEI message. A random access point SEI message contains an indicator of a random access entry point for a decoder. The entry point is indicated as a count relative to the position of the SEI message in units of coded frame numbers prior to the frame number of the current picture. In a random access point SEI message, preroll_count indicates the entry point for the decoding process, and postroll_count indicates the recovery point of output. The exact_match_flag indicates whether decoded pictures at and subsequent to the recovery point in output order obtained by starting the decoding process at the specified entry point shall be an exact match to the pictures that would be produced by a decoder starting at the last prior instantaneous decoder refresh ("IDR") point in the NAL unit stream. (An IDR picture is an I-picture that causes a decoder to mark all reference pictures in a decoded pictures buffer as unused immediately before decoding the IDR picture, and to indicate that later coded pictures can be decoded without inter prediction from any picture decoded prior to the IDR picture.) The broken_link_flag indicates the presence or absence of a splicing point in the NAL unit stream at the location of the random access point SEI message.

For additional information, see the standards themselves.

B. Trick Modes

The MPEG-2 standard describes special access, search and scan modes (examples of trick modes). According to ISO/IEC 13818-02, the 1-bit DSM_trick_mode_flag in a program elementary stream ("PES") packet indicates that the PES packet in an MPEG-2 elementary stream is reconstructed from digital storage media ("DSM") in a trick mode. When DSM_trick_mode_flag is set, eight bits of trick mode information (the DSM_trick_modes element) follow in the PES packet. The first three bits indicate the trick mode (e.g., fast forward, slow motion, freeze frame, fast reverse, slow reverse) and the remaining five bits provide information specific to the indicated trick mode. For example, ISO/IEC 13818-1:2000 specifies that if DSM_trick_mode_flag=1, the 3-bit element trick_mode_control indicates the specific trick mode, while the next five bits indicate provide other information depending on the specific trick mode, such as indicators of which field should be displayed or whether an entire frame should be displayed (field_id), number of times a field or frame should be repeated (rep_cntrl), coefficient frequency truncation information (frequency_truncation), and intra-slice refresh information (intra_slice_refresh).

When a decoder is decoding a PES packet with DSM_trick_mode_flag=1, the 13818-02 recommends decoders to decode the bitstream and display according to the DSM_trick_modes element. For pre-processing, the MPEG-2 standard recommends that decoders clear a non-trick mode bitstream from the buffer when the decoder encounters a PES packet with DSM_trick_mode_flag=1. For post-processing, the MPEG-2 standard recommends that decoders clear a trick mode bitstream from the buffer when the decoder encounters a PES packet with DSM_trick_mode_flag=0. MPEG-2 recommends a decoder decoding a PES packet with DSM_trick_mode_flag=1 to decode one picture and display it until next picture is decoded. If the decoder encounters a gap between slices, the decoder is recommended to decode the slice and display it according to the slice vertical position in slice header, and fill the gap with a co-located part of the last displayed picture.

ISO/IEC 13818-06 describes a different approach for trick modes. According to ISO/IEC 13818-06, stream primitives (e.g., "Stream pause( )", "Stream resume( )", and "Stream play( )") are used to emulate VCR-like controls for manipulating MPEG continuous media streams.

C. Limitations of the Standards

These international standards are limited in several important ways. For example, in MPEG-2, the first coded frame after a GOP header must be a "coded I-frame"—an intra-coded frame picture or a pair of field pictures where the first field picture encoded in the bitstream is an I-picture and the second field picture encoded in the bitstream is either an I-picture or a P-picture. GOP headers are not allowed to precede any other frame type. In MPEG-4, a group of VOP header must be followed by a coded I-VOP.

Trick mode signaling and processing according to 13818-01 and -02 have many disadvantages. They involve tight coordination between the decoder of the MPEG-2 video bitstream and the receiver-side components processing the PES packets and trick mode syntax elements therein. This complicates the design and implementation of the decoder of the MPEG-2 video bitstream. In addition, the MPEG-2 trick modes typically require the receiver-side components to adjust time stamps for individual pictures in order to maintain synchronization of various decoding buffers, which further complicates trick mode processing. While the mechanism described in 13818-06 simplifies decoder development and implementation to some extent, the latency between client and server can lead to unacceptable delays in trick mode performance, especially when consumers expect VCR-like functionality and responsiveness.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for processing video in a video encoder and decoder. Described embodiments implement one or more of the described techniques and tools including, but not limited to, the following:

In one aspect, in a bitstream comprising plural layers, an encoder inserts plural different entry point segment control parameters in an entry point header. Each of the plural different entry point segment control parameters affects decoding or display of one or more pictures in an entry point segment of the bitstream. Each of the plural different entry point segment control parameters is selected from the group consisting of: a pan scan on/off parameter, a reference frame distance on/off parameter, a loop filtering on/off parameter, a fast chroma motion compensation on/off parameter, an extended range motion vector on/off parameter, a variable sized transform on/off parameter, an overlapped transform on/off parameter, a quantization decision parameter, and an extended differential motion vector coding on/off parameter. The entry point segment can comprise an entry point key frame (e.g., a P/I-frame or some other type of key frame).

In another aspect, a decoder receives an entry point header comprising plural control parameters for an entry point segment corresponding to the entry point header. The entry point header is in an entry point layer of a bitstream comprising plural layers. The decoder decodes the entry point header. The plural control parameters include two or more of: a pan scan on/off parameter, a reference frame distance on/off parameter, a loop filtering on/off parameter, a fast chroma motion compensation on/off parameter, an extended range motion vector on/off parameter, a variable sized transform on/off parameter, an overlapped transform on/off parameter, a quantization decision parameter, and an extended differential motion vector coding on/off parameter. The plural control parameters can further comprise a broken link parameter, a closed entry parameter, one or more coded picture size parameters, one or more range mapping parameters (e.g., chroma or luma range mapping parameters), a hypothetical reference decoder buffer parameter, and/or other parameter(s). The fast chroma motion compensation on/off parameter can indicate mechanisms for sub-pixel interpolation for chroma samples and rounding of chroma motion vectors. The quantization decision parameter can indicate one or more layers of signaling for quantization step sizes or a quantizer selection.

In another aspect, a decoder receives an entry point header comprising plural control parameters for an entry point segment corresponding to the entry point header. The entry point segment comprises plural frames. The decoder decodes the entry point header. The plural control parameters comprise at least a reference frame distance on/off parameter, a loop filtering on/off parameter, a fast chroma motion compensation on/off parameter, an extended range motion vector on/off parameter, a variable sized transform on/off parameter, an overlapped transform on/off parameter, and a quantization decision parameter. The plural control parameters may further comprise an extended differential motion vector coding on/off parameter, a pan scan on/off parameter, and/or some other parameter(s).

The scope of parameters listed in an entry point header structure is limited to the sequence corresponding to the preceding sequence header in the bitstream. The parameters are applicable until the occurrence of the next entry point header.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing an interlaced frame according to the prior art.

FIG. 2 is a block diagram of a suitable computing environment in which several described embodiments may be implemented.

FIGS. 17A-B are a table showing details for syntax elements in the entry point layer bitstream syntax of FIG. 16.

DETAILED DESCRIPTION

Figure 3:
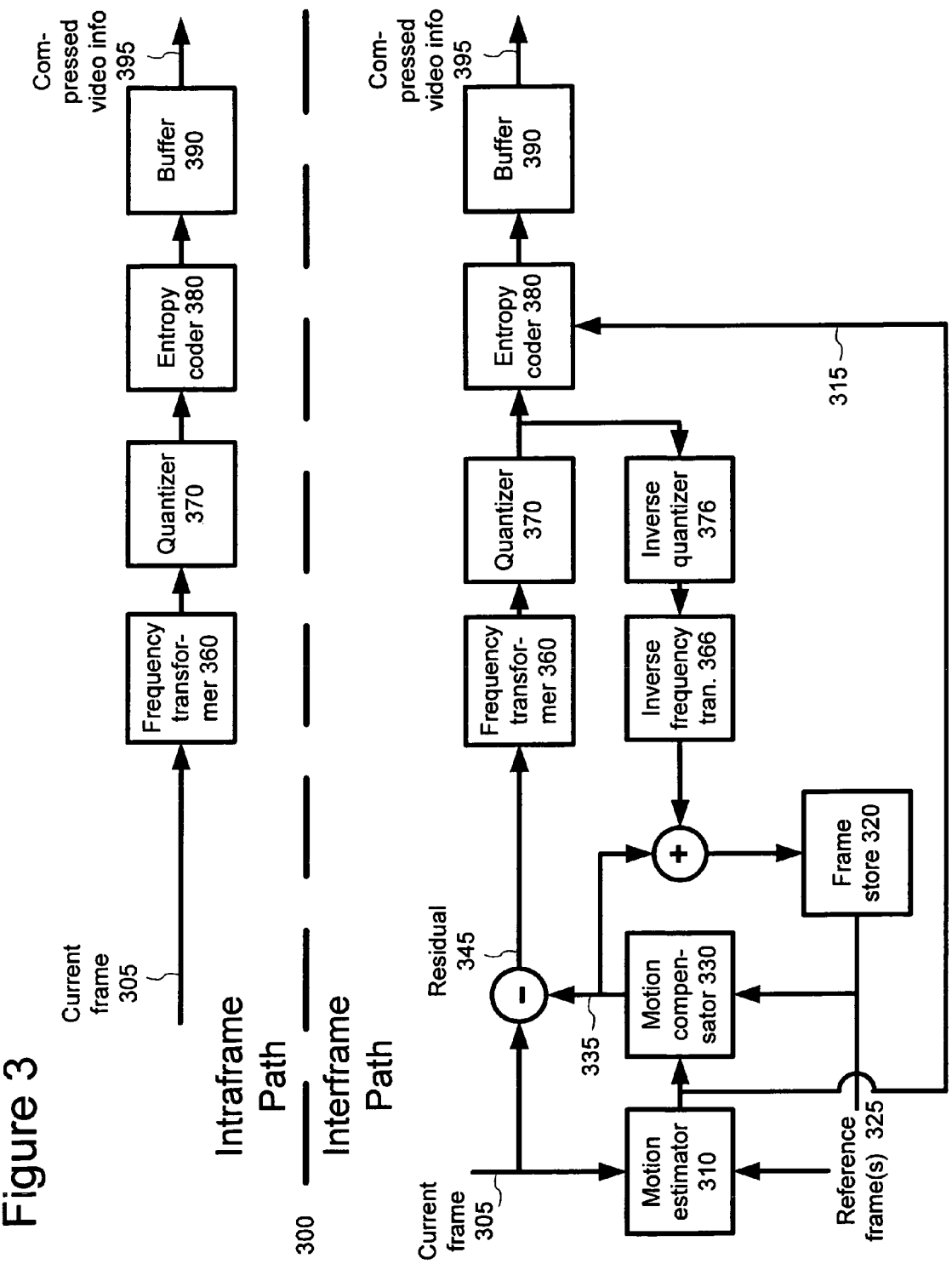
FIG. 3 is a block diagram of a generalized video encoder system used in several described embodiments.

The present application relates to techniques and tools for efficient compression and decompression of video. In various described embodiments, a video encoder and decoder incorporate techniques and tools for encoding and decoding video using entry points to facilitate random access and changing of coding parameters and to facilitate implementation of trick modes.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific formats and arrangements of syntax elements, other formats and arrangements also can be used. In addition, although the term "element" can be used to refer to one-bit flags or other "atomic" bitstream syntax elements, the term element can also be used to refer to other kinds of information such as fixed or variable-length codes, joint codes, or conditional or hierarchical syntax structures. Further, described modules of video encoder and decoder systems can in some implementations be rearranged or replaced with different modules.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

FIG. 2 illustrates a generalized example of a suitable computing environment 200 in which several of the described embodiments may be implemented. The computing environment 200 is not intended to suggest any limitation as to scope of use or functionality, as the techniques and tools may be implemented in diverse general-purpose or special-purpose computing environments.

With reference to FIG. 2, the computing environment 200 includes at least one processing unit 210 and memory 220. In FIG. 2, this most basic configuration 230 is included within a dashed line. The processing unit 210 executes computer-executable instructions and may be a real or a virtual processor. In a multi-processing system, multiple processing units execute computer-executable instructions to increase processing power. The memory 220 may be volatile memory (e.g., registers, cache, RAM), non-volatile memory (e.g., ROM, EEPROM, flash memory, etc.), or some combination of the two. The memory 220 stores software 280 implementing a video encoder or decoder.

A computing environment may have additional features. For example, the computing environment 200 includes storage 240, one or more input devices 250, one or more output devices 260, and one or more communication connections 270. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, DVDs, or any other medium which can be used to store information and which can be accessed within the computing environment 200. The storage 240 stores instructions for the software 280 implementing the video encoder or decoder.

The input device(s) 250 may be a touch input device such as a keyboard, mouse, pen, or trackball, a voice input device, a scanning device, or another device that provides input to the computing environment 200. For audio or video encoding, the input device(s) 250 may be a sound card, video card, TV tuner card, or similar device that accepts audio or video input in analog or digital form, or a CD-ROM or CD-RW that reads audio or video samples into the computing environment 200. The output device(s) 260 may be a display, printer, speaker, CD-writer, or another device that provides output from the computing environment 200.

The communication connection(s) 270 enable communication over a communication medium to another computing entity. The communication medium conveys information such as computer-executable instructions, audio or video input or output, or other data in a data signal (e.g., a modulated data signal). A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, within the computing environment 200, computer-readable media include memory 220, storage 240, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses certain terms to describe computer operations in a computing environment. Such terms are high-level abstractions for operations performed by a computer, and should not be confused with acts performed by a human being. The actual computer operations corresponding to these terms vary depending on implementation.

II. Generalized Video Encoder and Decoder

Figure 4:
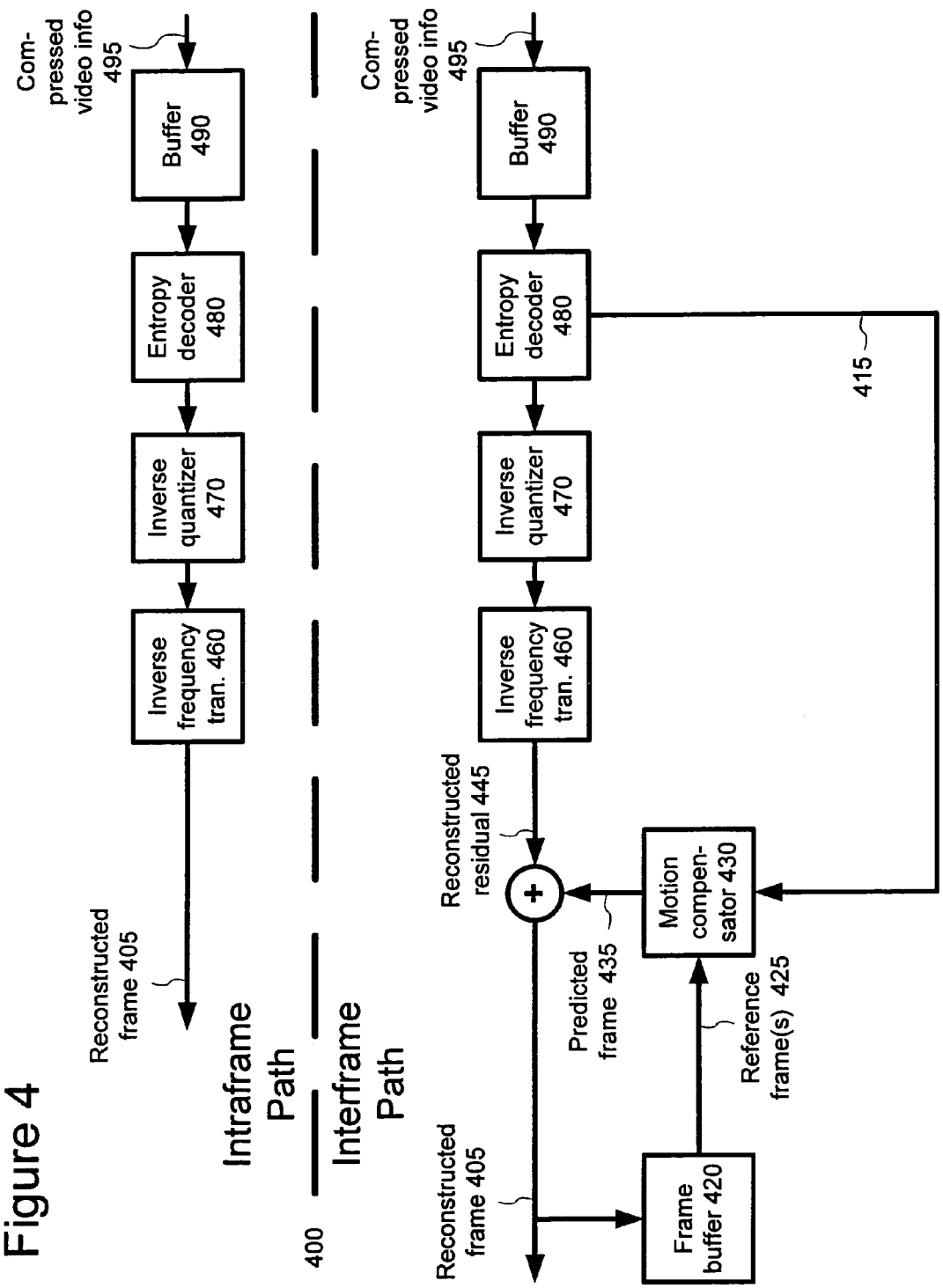
FIG. 4 is a block diagram of a generalized video decoder system used in several described embodiments.

FIG. 3 is a block diagram of a generalized video encoder 300 and FIG. 4 is a block diagram of a generalized video decoder 400.

The relationships shown between modules within the encoder and decoder indicate the main flow of information in the encoder and decoder; other relationships are not shown for the sake of simplicity. In particular, FIGS. 3 and 4 generally do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder 300 and decoder 400 are block-based and use a 4:2:0 macroblock format. Alternatively, the encoder 300 and decoder 400 are object-based or use a different macroblock or block format.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 3 is a block diagram of a general video encoder system 300. The encoder system 300 receives a sequence of video frames including a current frame 305, and produces compressed video information 395 as output. Particular embodiments of video encoders typically use a variation or supplemented version of the generalized encoder 300.

The encoder system 300 compresses predicted frames and key frames. For the sake of presentation, FIG. 3 shows a path for key frames through the encoder system 300 and a path for predicted frames. Many of the components of the encoder system 300 are used for compressing both key frames and predicted frames. The exact operations performed by those components can vary depending on the type of information being compressed.

A predicted frame (also called P-frame, B-frame for bi-directional prediction, or inter-coded frame) is represented in terms of prediction (or difference) from one or more reference (or anchor) frames. A prediction residual is the difference between what was predicted and the original frame. In contrast, a key frame (also called I-frame, intra-coded frame) is compressed without reference to other frames. Intra-coded frames include progressive I-frames, interlaced I-frames (frame interlaced mode), interlaced BI-frames (B-frames encoded using intra coding techniques) and I/l frames (field interlaced mode). Parts of other frames also can be compressed without reference to other frames. For example, the I-fields of P/I- or I/P-frames are compressed without reference to other frames and are described in detail below.

If the current frame 305 is a forward-predicted frame, a motion estimator 310 estimates motion of macroblocks or other sets of pixels of the current frame 305 with respect to a reference frame, which is the reconstructed previous frame 325 buffered in a frame store (e.g., frame store 320). If the current frame 305 is a bi-directionally-predicted frame (a B-frame), a motion estimator 310 estimates motion in the current frame 305 with respect to two reconstructed reference frames. Typically, a motion estimator estimates motion in a B-frame with respect to a temporally previous reference frame and a temporally future reference frame.

The motion estimator 310 outputs as side information motion information 315 such as motion vectors. A motion compensator 330 applies the motion information 315 to the reconstructed frame(s) 325 to form a motion-compensated current frame 335. The prediction is rarely perfect, however, and the difference between the motion-compensated current frame 335 and the original current frame 305 is the prediction residual 345. Alternatively, a motion estimator and motion compensator apply another type of motion estimation/compensation.

A frequency transformer 360 converts the spatial domain video information into frequency domain (i.e., spectral) data. A quantizer 370 then quantizes the blocks of spectral data coefficients. In addition to quantization, the encoder 300 can use frame dropping, adaptive filtering, or other techniques for rate control.

When a reconstructed current frame is needed for subsequent motion estimation/compensation, an inverse quantizer 376 performs inverse quantization on the quantized spectral data coefficients. An inverse frequency transformer 366 then performs the inverse of the operations of the frequency transformer 360, producing a reconstructed prediction residual (for a predicted frame) or a reconstructed key frame. If the current frame 305 was a key frame, the reconstructed key frame is taken as the reconstructed current frame (not shown). If the current frame 305 was a predicted frame, the reconstructed prediction residual is added to the motion-compensated current frame 335 to form the reconstructed current frame. A frame store (e.g., frame store 320) buffers the reconstructed current frame for use in predicting another frame.

The entropy coder 380 compresses the output of the quantizer 370 as well as certain side information (e.g., motion information 315, quantization step size). Typical entropy coding techniques include arithmetic coding, differential coding, Huffman coding, run length coding, LZ coding, dictionary coding, and combinations of the above.

The entropy coder 380 puts compressed video information 395 in the buffer 390. A buffer level indicator is fed back to bit rate adaptive modules. The compressed video information 395 is depleted from the buffer 390 at a constant or relatively constant bit rate and stored for subsequent streaming at that bit rate. Therefore, the level of the buffer 390 is primarily a function of the entropy of the filtered, quantized video information, which affects the efficiency of the entropy coding. Alternatively, the encoder system 300 streams compressed video information immediately following compression, and the level of the buffer 390 also depends on the rate at which information is depleted from the buffer 390 for transmission.

Before or after the buffer 390, the compressed video information 395 can be channel coded for transmission over the network. The channel coding can apply error detection and correction data to the compressed video information 395.

B. Video Decoder

FIG. 4 is a block diagram of a general video decoder system 400. The decoder system 400 receives information 495 for a compressed sequence of video frames and produces output including a reconstructed frame 405. Particular embodiments of video decoders typically use a variation or supplemented version of the generalized decoder 400.

The decoder system 400 decompresses predicted frames and key frames. For the sake of presentation, FIG. 4 shows a path for key frames through the decoder system 400 and a path for predicted frames. Many of the components of the decoder system 400 are used for decompressing both key frames and predicted frames. The exact operations performed by those components can vary depending on the type of information being decompressed.

A buffer 490 receives the information 495 for the compressed video sequence and makes the received information available to the entropy decoder 480. The buffer 490 typically receives the information at a rate that is fairly constant over time, and includes a jitter buffer to smooth short-term variations in bandwidth or transmission. The buffer 490 can include a playback buffer and other buffers as well. Alternatively, the buffer 490 receives information at a varying rate. Before or after the buffer 490, the compressed video information can be channel decoded and processed for error detection and correction.

The entropy decoder 480 entropy decodes entropy-coded quantized data as well as entropy-coded side information (e.g., motion information 415, quantization step size), typically applying the inverse of the entropy encoding performed in the encoder.

A motion compensator 430 applies motion information 415 to one or more reference frames 425 to form a prediction 435 of the frame 405 being reconstructed. For example, the motion compensator 430 uses a macroblock motion vector to find a macroblock in a reference frame 425. A frame buffer (e.g., frame buffer 420) stores previously reconstructed frames for use as reference frames. Typically, B-frames have more than one reference frame (e.g., a temporally previous reference frame and a temporally future reference frame). The prediction by the motion compensator is rarely perfect, so the decoder 400 also reconstructs prediction residuals.

When the decoder needs a reconstructed frame for subsequent motion compensation, a frame buffer (e.g., frame buffer 420) buffers the reconstructed frame for use in predicting another frame.

An inverse quantizer 470 inverse quantizes entropy-decoded data. An inverse frequency transformer 460 converts the quantized, frequency domain data into spatial domain video information.

III. Video Frame Organizations

In some implementations, the encoder 300 and decoder 400 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 500 shown in FIG. 5. The macroblock 500 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further subdivided at different stages, e.g., at the frequency transform (e.g., 8×4, 4×8 or 4×4 discrete cosine transforms ("DCTs") or derivatives of DCT methods) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 6A:
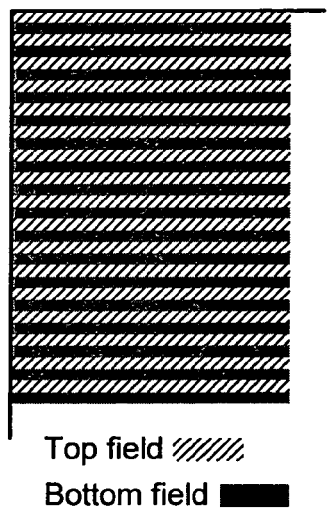
FIG. 6A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 6A shows part of an interlaced video frame 600, including the alternating lines of the top field and bottom field at the top left part of the interlaced video frame 600.

A. Frame Coding

Figure 5:
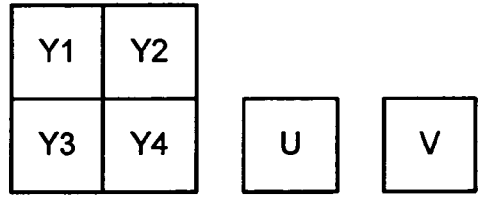
FIG. 5 is a diagram of a macroblock format used in several described embodiments.
Figure 6B:
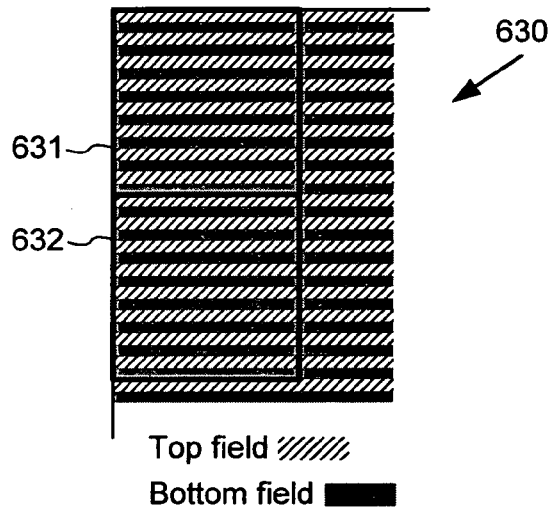
FIG. 6B is a diagram of the interlaced video frame organized for encoding/decoding as a frame.

FIG. 6B shows the interlaced video frame 600 of FIG. 6A organized for encoding/decoding as a frame 630 (i.e., a frame interlace coded frame). The interlaced video frame 600 has been partitioned into macroblocks such as the macroblocks 631 and 632, which use a 4:2:0 format as shown in FIG. 5. In the luminance plane, each macroblock 631, 632 includes 8 lines from the top field alternating with 8 lines from the bottom field for 16 lines total, and each line is 16 pixels long. (The actual organization and placement of luminance blocks and chrominance blocks within the macroblocks 631, 632 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

B. Field Coding

Figure 6C:
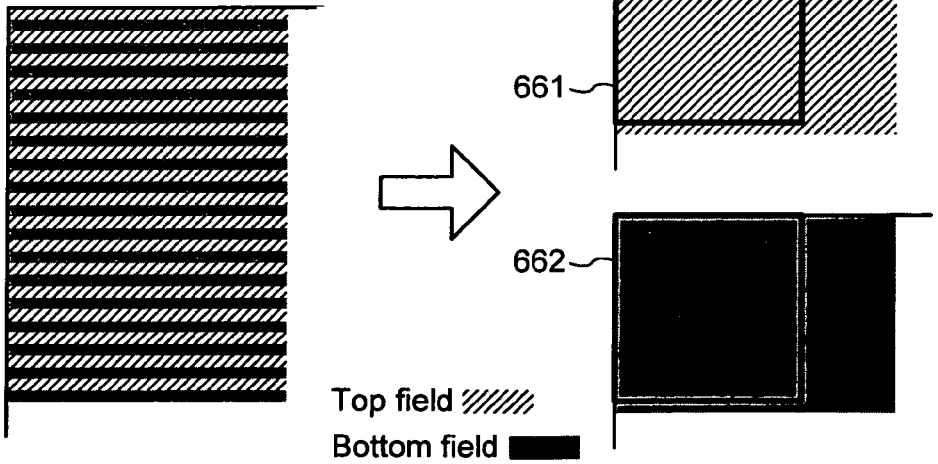
FIG. 6C is a diagram of the interlaced video frame organized for encoding/decoding as fields.

FIG. 6C shows the interlaced video frame 600 of FIG. 6A organized for encoding/decoding as fields 660. Each of the two fields of the interlaced video frame 600 is partitioned into macroblocks. The top field is partitioned into macroblocks such as the macroblock 661, and the bottom field is partitioned into macroblocks such as the macroblock 662. (Again, the macroblocks use a 4:2:0 format as shown in FIG. 5, and the organization and placement of luminance blocks and chrominance blocks within the macroblocks are not shown.) In the luminance plane, the macroblock 661 includes 16 lines from the top field and the macroblock 662 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Figure 7:
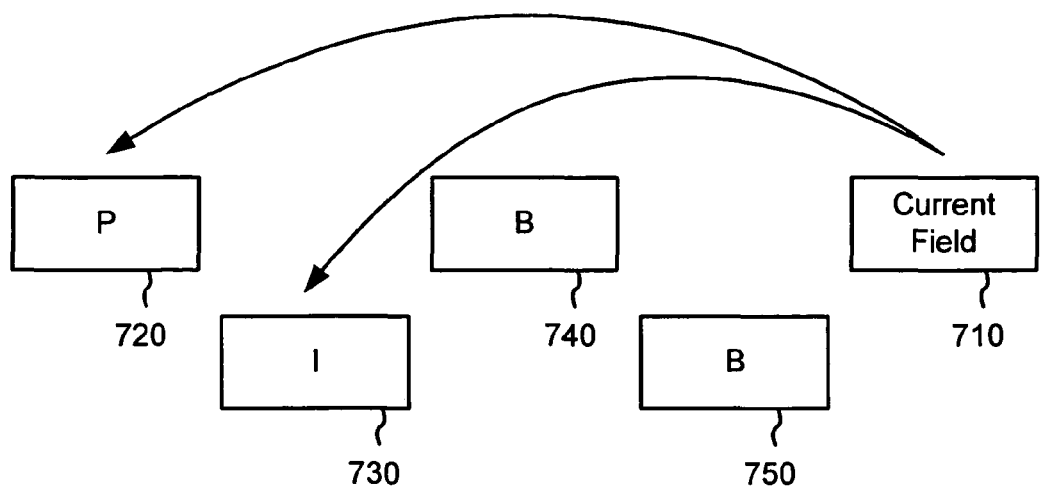
FIGS. 7 and 8 are diagrams showing interlaced P-fields having two reference fields.
Figure 8:
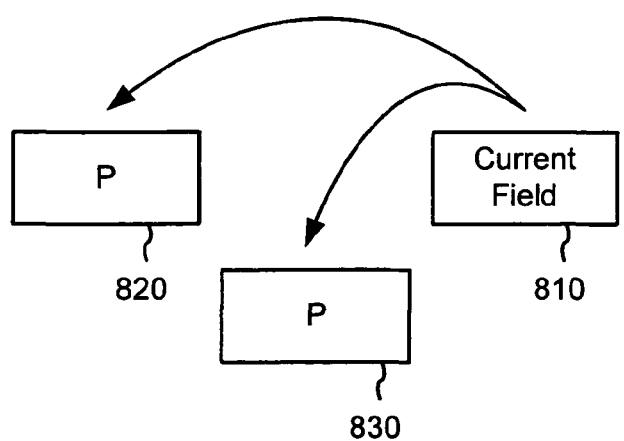

Interlaced P-fields reference one or more other fields (typically previous fields in the bitstream). FIGS. 7 and 8 show examples of interlaced P-fields having two reference fields. In FIG. 7, current field 710 refers to an interlaced P-field 720 and an interlaced I-field 730 in a temporally previous frame. Since fields 740 and 750 are interlaced B-fields, they are not used as reference fields. In FIG. 8, current field 810 refers to interlaced P-fields 820 and 830 in a frame immediately previous to the frame containing the current field 810.

Figure 9:
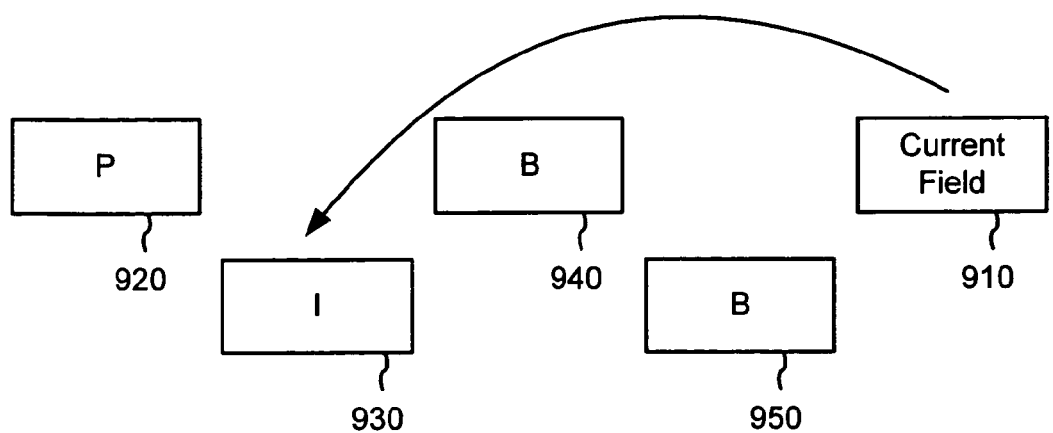
FIGS. 9 and 10 are diagrams showing interlaced P-fields using the most recent allowable reference field.
Figure 10:
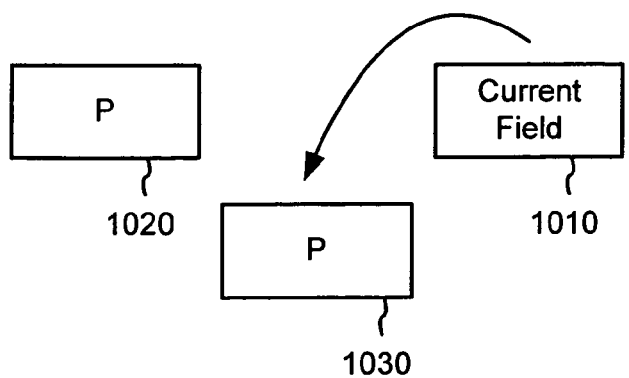

FIGS. 9 and 10 show examples of interlaced P-fields having one reference field—the temporally most recent allowable reference field. In FIG. 9, current field 910 refers to interlaced I-field 930 in a temporally previous frame, but does not refer to interlaced P-field 920. In the example shown in FIG. 9, fields 940 and 950 are interlaced B-fields and are not allowable reference fields. In FIG. 10, current field 1010 refers to interlaced P-field 1030 in a frame immediately previous to the frame containing the current field 1010, rather than interlaced P-field 1020.

Interlaced video frames organized for encoding/decoding as fields (i.e., a field interlace coded frame) can include various combinations of different field types. The first coded field of a frame (i.e., the field occurring first in the bitstream) can be either a top or bottom field, and the second coded field of a frame (i.e., the field occurring second in the bitstream) is the opposite polarity field (i.e., the second field is the top field if the first field is the bottom field, the second field is the bottom field if the first field is the top field). The top field and bottom field can each be either predicted fields or intra-coded fields, and the frame can have the same field type for both the first field and the second field or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

IV. Entry Points and Start Codes

Entry points are locations in an elementary bitstream from which a digital video processing system can decode or process the bitstream without the need of any preceding picture information in the bitstream. (The system may still use preceding sequence-layer information.) For example, for a video receiver an entry point signals the presence of a special location in a bitstream to begin or resume decoding (e.g., where there is no dependency on past decoded video fields or frames to decode the video frame following immediately an entry point indicator). Entry points can be inserted at regular or irregular intervals in a bitstream. An encoder can adopt different policies to govern the insertion of entry points in a bitstream. Entry points can also be used to signal changes or updates to the control parameters such as buffer management values or on/off decisions for decoding options.

In some implementations, an encoder indicates an entry point in a bitstream with an entry point start code. In general, an encoder uses start codes to signal different features (e.g., sequences, entry point segments, frames, slices, fields, user data, etc.) in a bitstream. Entry point start codes differentiate entry points from other features in a bitstream.

The frames following an entry point start code up to the next entry point start code can be referred to as an entry point segment. In some implementations, an entry point start code is followed in a bitstream by an entry point header. An entry point header contains information relevant to frames in the entry point segment.

Entry point start codes can take the form of a unique series of 32 bits that is not emulated anywhere else in the bitstream, where the first three bytes are 0x000001 and the last byte identifies the start code as an entry point start code. Other start code formats also can be used. For example, the entry point start code can be an abbreviated start code (e.g., one byte) sufficient to distinguish the entry point start code from other kinds of start codes in the video stream. Entry point start codes can be used along with other start codes in a bitstream, such as sequence start codes, frame start codes, field start codes, slice start codes, and user data start codes, which, like entry point start codes, may be 32 bits in length. In cases where each type of start code is of the same length, the various types of start codes can have different last bytes that differentiate start codes of different types. Other start code formats also can be used for non-entry point start codes. Start code formats used in some implementations are described in further detail below in Section VIII.

The first frame following an entry point start code (e.g., the first key frame of an entry point segment) can be one of several types. In some implementations, the first key frame of an entry point segment can be a progressive I-frame, an interlaced I-frame, or a field interlace coded frame having at least one intra-coded field (e.g., an I/I-frame, a P/I-frame, or an I/P-frame).

Frames that can follow entry point key frames in an entry point segment include both key frames and predicted frames. To maintain a separately decodable entry point segment, however, certain restrictions may be placed on the kinds of frames that are included in the entry point segment. In general, the reference frame for a progressive P-frame is the first I- or P-frame preceding the frame, and the reference frame(s) for a progressive B-frame may further include the first I- or P-frame following the frame. Similar rules apply for frame interlaced mode P-frames and B-frames. For field interlaced frames, the reference field(s) for a P-field are, for example, one or both of the first I- or P-fields preceding the field. The reference field(s) for a B-field are, for example, the two temporally preceding I- or P-fields and two temporally subsequent I- or P-fields. In some cases, a reference field for a B-field may be in the same frame, such as when a second B-field references a first B-field in the same frame. In some implementations, however, the kinds of frames that can legally be included in a particular entry point segment are subject to certain conditions, such as those described in Section VIII, below.

Frame and field types can be signaled in headers for frames and fields. For example, for a frame coded using field interlace coding, the picture types for the fields (e.g., I/I, P/I, or I/P) are signaled in a frame header. Alternatively, a bitstream element in each field header indicates the picture type for each field in the frame. Signaling for frame and field types is described in further detail in Section V, below.

Using frames (as opposed to fields) as units for packetization may be preferred even if the sequence is interlaced and is better coded as pairs of fields. For example, if Microsoft's Advanced Systems Format (ASF) is used as a transport layer, individual packets correspond to units of compressed frames, where the frame could be a pair of compressed fields.

Although the discussion herein generally focuses on video encoders and decoders, it should be understood that the techniques and tools described herein may be used by other digital video processing systems, such as video splicers, commercial insertion tools, video editors, video summarization engines, etc.

V. Signaling for P/I-Frames and Corresponding Entry Points

In prior video codecs, for a field interlaced frame to serve as a random access point, the first field needed to be intra-coded. In other words, field interlaced frames suitable to serve as random access points were limited to I/I-frames and I/P-frames. However, in some cases the second field in a random access point frame lends itself more naturally to intra-coding (and the first to predictive coding), such as when a scene change occurs in the second field. In such cases, requiring the first field in a random access point frame to also be intra-coded will unnecessarily increase the cost in terms of bit rate for providing a random access point; the additional bits needed for intra coding of the first field will reduce compression efficiency.

Accordingly, described techniques and tools allow a frame where the first field is not intra-coded (e.g., a predicted field) and the second field is intra-coded (e.g., an I-field) to be a random access point, improving compression efficiency in some sequences or portions of sequences (e.g., entry point segments). An example of such a frame is a P/I-frame.

Described techniques relating to signaling for entry point key frames such as P/I-frames include, but are not limited to, the following:

1. Encoding/decoding a separate frame layer syntax element in the bitstream that precedes individual field picture headers and data. Such a syntax element allows field types for fields in a field interlace coded frame (e.g., a P/I-frame) to be identified at frame level, which in turn helps a decoder pass over decoding of a P-field of a P/I frame when decoding starts from an entry point.
2. Encoding/decoding a start code syntax element before the second field of an entry point key frame. Such a syntax element again helps a decoder to skip the first field of a frame (e.g., a P/I-frame) and begin decoding from the second field.

Examples of such techniques are described in further detail below.

A. SIGNALING P/I-FRAMES IN FRAME LAYER

Described techniques and tools allow a frame with a predicted first field (e.g., a P-field) and an intra-coded second field (e.g., an I-field) to be the first frame of an entry point segment (i.e., a entry point key frame). Techniques for signaling coding type information for entry point key frames with a predicted first field and an intra coded second field are described in this section.

For example, in some implementations, when a frame is coded as two interlaced fields, a separate frame header precedes the individual fields. The frame header contains syntax elements containing coding type information for the frame. One syntax element signals a frame coding mode (e.g., field interlace) for the frame. For a field interlace coded frame, another syntax element identifies the types and ordering of the individual fields in the frame, such as by identifying a first field in the frame as a P-field and the second field as an I-field.

Figure 11:
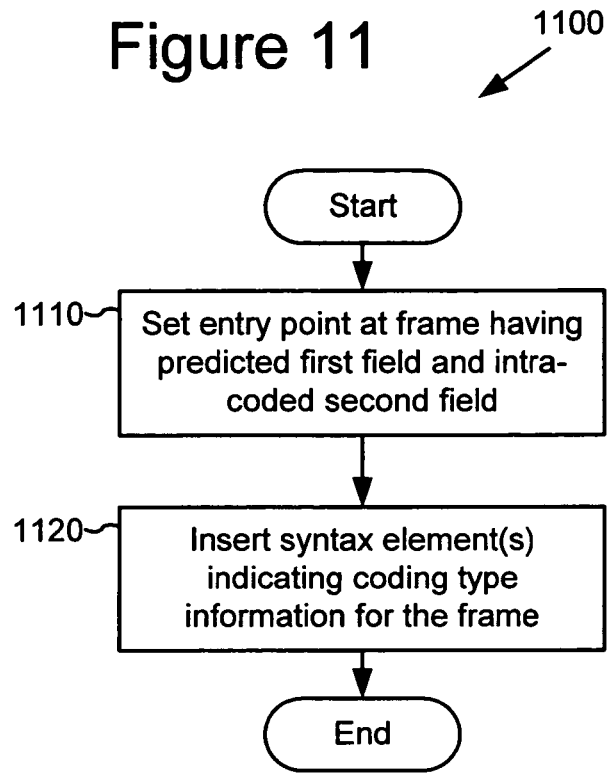
FIG. 11 is a flow chart showing a technique for signaling coding type information for a field interlace coded frame having a predicted first field and an intra-coded second field.

FIG. 11 shows a technique 1100 for encoding an entry point key frame having a predicted first field and an intra-coded second field. At 1110, an encoder sets an entry point at a frame having a predicted first field and an intra-coded second field. Then, at 1120, the encoder inserts a syntax element (e.g., at frame level) indicating coding type information for the frame. For example, the syntax element could indicate a frame coding mode (such as field interlace) for an entire frame, or the syntax element could indicate field coding types (such as P- or I-) for individual fields in a frame. The encoder can additionally insert a second syntax element to provide additional coding type information for the frame. For example, an encoder sets an entry point at a frame, inserts a syntax element at frame level indicating frame interlace as the frame coding mode for the frame, and inserts a second syntax element at frame level identifying the types of the first field and the second field of the frame.

Figure 12:
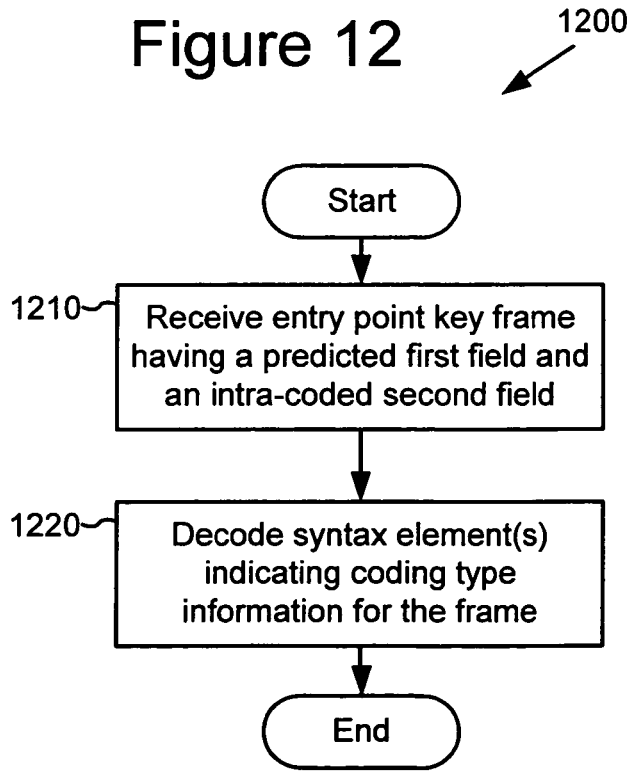
FIG. 12 is a flow chart showing a technique for decoding coding type information for an entry point key frame having a predicted first field and an intra-coded second field.

FIG. 12 shows a technique 1200 for decoding an entry point key frame having a predicted first field and an intra-coded second field. At 1210, a decoder receives an entry point key frame having a predicted first field and an intra-coded second field. Then, at 1220, the decoder decodes a syntax element that contains coding type information for the frame. The decoder can additionally decode a second syntax element (if it is present in the bitstream) that indicates additional coding type information for the frame. For example, a decoder receives a frame header for an entry point key frame, decodes a syntax element at frame level indicating frame interlace as the frame coding mode for the frame, and decodes a second syntax element at frame level identifying the types of the first field and the second field of the frame.

Signaling field types at frame level provides some advantages. For example, providing a separate frame layer syntax element that identifies field types and ordering and precedes individual field headers and field data allows field types in a P/I-frame to be identified at frame level, and therefore allows the frame to be identified as a suitable entry point at frame level. A decoder searching for a random access point can scan a frame header to determine the coding types of both fields in a field interlace coded frame. More specifically, if a decoder searching for a random access point receives information indicating a P/I-frame in a frame header, it can decode the rest of the frame header and then decode the second field (the I-field) while skipping decoding of the first field (the P-field). At the same time, when decoding does not start from the P/I-frame as an entry point, the P-field is decoded, and the P-field is efficiently compressed for such cases.

Elements of a basic frame layer syntax for a field interlace coded frame in some implementations are described below in Table 1.

TABLE 1

Elements of Frame Layer Syntax for P/I-frame

| | Number of Bits |
|---|---|
| PICTURE LAYER( ) { | |
|   FCM | Variable size |
|   FPTYPE | 3 |
|   ... | |
|   Other Frame layer syntax element(s) | |
|   ... | |
|   for (each field) { | |
|     FIELDPICLAYER( ) | |
|   } | |
| } | |

In some implementations, frame coding mode FCM (shown in Table 1, above) is a variable-length syntax element that indicates whether a frame is coded using progressive coding, frame interlace coding, or field interlace coding. If a frame is coded using field interlace coding, the next syntax element is FPTYPE (also shown in Table 1, above). FPTYPE indicates the field types and ordering for the individual fields in the frame. For example, for a P/I-frame, FPTYPE indicates that the first field of the frame is a P-field and that the second field of the frame is an I-field.

In some implementations, FPTYPE is a 3-bit syntax element that takes on the values shown in Table 2, below.

TABLE 2

FPTYPE Values

| FPTYPE FLC | First Field Picture Type | Second Field Picture Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

As shown in Table 2, above, an encoder can indicate that a first field in a field interlace coded frame is a P-field and that a second field in the frame is an I-field by assigning the value '010' to the frame-level FPTYPE syntax element. A decoder receiving the FPTYPE syntax element can then determine types (e.g, P-, I-) for the first and second fields in the frame.

The code tables shown in Tables 1 and 2 above are only examples. Other coding schemes can be used to signal frame and field coding type information in accordance with the described techniques.

B. FIELD START CODES IN P/I-FRAMES

When a P/I-frame is an entry point key frame, the entry point does not apply to the P-field data located between the entry point start code and the following I-field data. In other words, the P-field of the P/I-frame is not part of the independently decodable entry point segment. This is because the P-field would normally refer to one or more reference fields that precede it in the bitstream, and such reference fields would be outside the entry point segment. Thus, when an entry point key frame is a P/I-frame, the P-field of the P/I-frame need not and should not be decoded when decoding begins or resumes at the entry point.

Accordingly, in some implementations, if an entry point key frame is a P/I-frame, an encoder uses a field start code to signal the beginning of the second field of the P/I-frame. The decoder can then skip decoding of the first field (the P-field) and begin or resume decoding at the second field (the I-field) of the P/I-frame by searching for the start code for the second field.

For example, an encoder inserts a start code after the end of the first field, and before the beginning of the second field (e.g., just before the beginning of the second field header). The positioning of a start code before the second field of the P/I-frame allows a decoder to identify the start of the second field, and allows the decoder to skip decoding of the first field and begin decoding from the second field.

Figure 13:
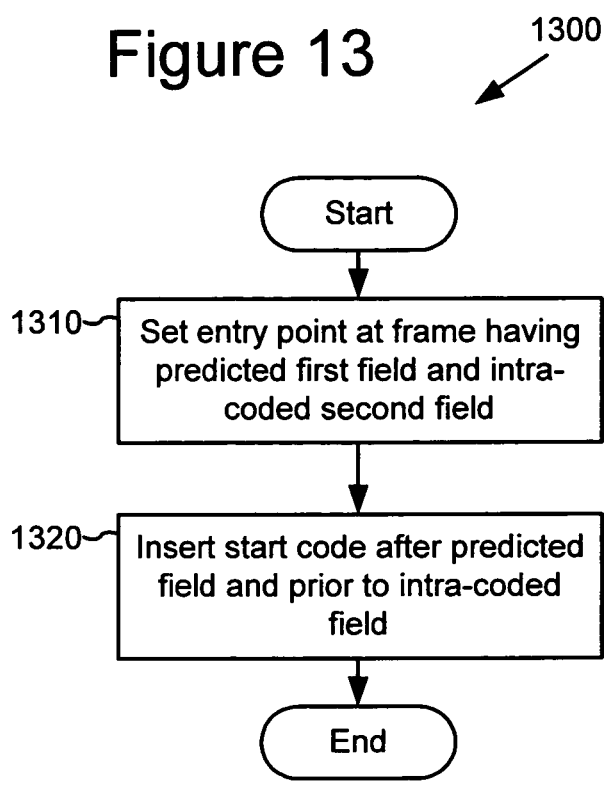
FIG. 13 is a flow chart showing a technique for encoding an entry point key frame having a predicted first field and an intra-coded second field with a start code prior to the second field.

FIG. 13 shows a technique 1300 for encoding an entry point key frame having a predicted first field and an intra-coded second field with a start code prior to the second field.

At 1310, an encoder sets an entry point at a frame having predicted first field and intra-coded second field (e.g., a P/I-frame). Then, at 1320, the encoder inserts a start code after the predicted field and prior to the intra-coded field.

Figure 14:
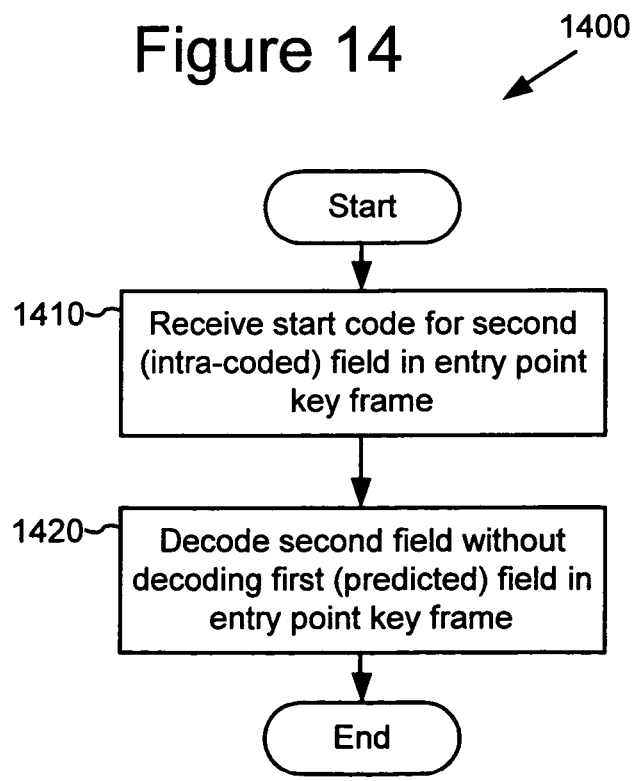
FIG. 14 is a flow chart showing a technique for decoding an entry point key frame having a predicted first field and an intra-coded second field with a start code prior to the second field.

FIG. 14 shows a technique 1400 for decoding starting from an entry point key frame having a predicted first field and an intra-coded second field with a start code prior to the second field. At 1410, a decoder receives a start code for an intra-coded second field in an entry point key frame. Then, at 1420, the decoder decodes the second field without decoding the predicted first field.

The start code for the intra-coded field can be in a format described herein or in some other format. Any code suitable for indicating a point at which a decoder can begin decoding the intra-coded field can be used.

C. EXAMPLE

Figure 15:
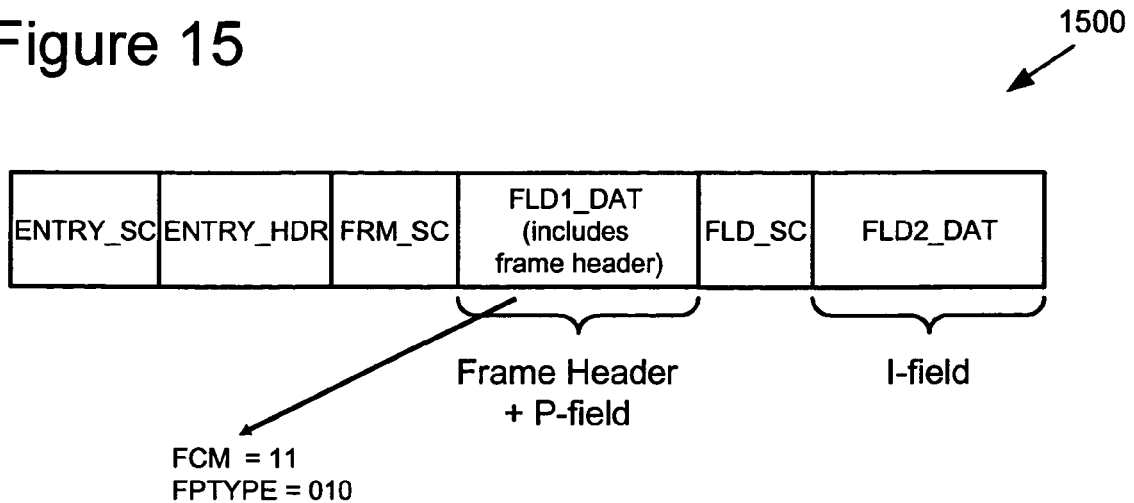
FIG. 15 is a diagram showing a portion of a bitstream with an interlaced P/I-frame entry point.

FIG. 15 shows an example of a part of a bitstream with a P/I-frame entry point. In FIG. 15, ENTRY_SC represents an entry point start code, ENTRY_HDR represents an entry point header, FRM_SC represents a frame start code, and FLD_SC represents a field start code. The element FLD1_DAT comprises a frame header for the frame and a field header and data for the first field (a P-field) in the frame. The element FLD2_DAT comprises a field header for the second field (an I-field) in the frame and data for the second field.

FIG. 15 also refers to the FCM and FPTYPE bitstream elements. In the example shown in FIG. 15, the FCM value '11' indicates that the frame is coded using field interlace coding. (For frames of other coding types, the value '0' indicates that the frame is coded using progressive coding (e.g., a progressive I-frame), and the value '10' indicates that the frame is coded using frame interlace coding (e.g., an interlaced I-frame). FCM is included in the frame header, which is part of the FLD1_DAT element shown in FIG. 15 but would be part of other elements in other frame coding modes. FPTYPE is also included in the frame header for a field-coded interlaced video frame, thus indicating field types for the frame at a level higher than field level in the bitstream. In the example shown in FIG. 15, the FPTYPE value '010' indicates that the frame is a P/I-frame.

The field start code represented by FLD_SC is positioned just before the FLD2_DAT element, allowing a decoder to detect the beginning of the intra-coded field in the P/I-frame for decoding.

Although FIG. 15 does not show a sequence start code or sequence header before the entry point start code, such syntax elements may precede the entry point start code.

VI. Entry Point Header Control Parameters

Coding control parameters determine which compression tools are enabled for a bitstream. Such parameters can be located in different syntax layers within a bitstream (e.g., sequence layer, entry-point layer, frame layer, field layer, slice layer, macroblock layer, and/or block layer). A sequence header may contain sequence-level parameters used to decode a whole sequence of compressed frames, while frame-level parameters may only apply to one particular frame. The presence of coding control parameters in an entry-point header allows an encoder/decoder to change some of the control parameters for a segment below sequence level but above frame level (e.g., an entry point segment) of the video sequence. This flexibility lets an encoder trade off signaling overhead for the control parameters against the improved compression efficiency enabled by changing the parameters. Implementations of the described techniques and tools therefore can significantly improve the flexibility and efficiency of video encoders and decoders, while only minimally increasing signaling overhead.

For example, in some implementations, an encoder/decoder uses the following syntax elements in an entry point header for the sake of supporting random access at the entry point.

Closed Entry Point (CLOSED_ENTRY)

CLOSED_ENTRY indicates whether a current entry point segment contains any B-pictures that require any picture in a previous entry point segment in order to decode the B-picture. In one implementation, CLOSED_ENTRY is a 1-bit syntax element. CLOSED_ENTRY=1 indicates that the current entry point segment does not contain any B-pictures that require an I- or P-picture in the previous entry point segment to decode. CLOSED_ENTRY=0 indicates that the entry point segment may contain B-pictures that require an I- or P-picture in the previous entry point segment to decode.

Broken Link Flag (BROKEN_LINK)

If CLOSED_ENTRY indicates that a current entry point segment may contain B-pictures that require any picture in a previous entry point segment in order to decode the B-picture, then BROKEN_LINK indicates whether the previous entry point segment required to decode any dependent B-pictures is still present. For example, in one implementation, BROKEN_LINK is a 1-bit syntax element. BROKEN_LINK=1 indicates that the entry point contains B-pictures which require an I- or P-picture in the previous entry point to decode, but the previous entry point is no longer present (usually because of an edit to replace preceding video frame(s) by another set of video frames (e.g., as the result of a commercial insertion)). If CLOSED_ENTRY=1 then BROKEN_LINK is undefined. If CLOSED_ENTRY=0 then BROKEN_LINK=0 indicates that the previous entry point segment required to decode any dependent B-pictures is still present.

In addition, in some implementations, an encoder/decoder uses one or more of the following kinds of syntax elements in an entry point header to signal encoding decisions for pictures in an entry point segment corresponding to the entry point header: a pan/scan element (e.g., PANSCAN_FLAG), a reference frame distance element (e.g., REFDIST_FLAG), a loop filtering element (e.g., LOOPFILTER), a sub-pixel interpolation and rounding element (e.g., FASTUVMC), an extended motion vector element (e.g., EXTENDED_MV), a differential quantization step size element (e.g., DQUANT), a variable-size transform element (e.g., VSTRANSFORM), an overlapped transform element (e.g., OVERLAP), a quantizer selection element (QUANTIZER), a hypothetical reference decoder element (e.g., HRD_FULLNESS), elements specifying coding size of frames (e.g., CODED_SIZE_FLAG, CODED_WIDTH, CODED_HEIGHT), an extended differential motion vector element (e.g., EXTENDED_DMV), and luma/chroma range mapping elements (e.g., RANGE_MAPY_FLAG, RANGE_MAPY, RANGE_MAPUV_FLAG, RANGE_MAPUV).

Different combinations of syntax elements can be used in an entry point header. For example, one or more of these coding control elements can be omitted or replaced with other elements not described here. Different combinations of syntax elements can be used depending on different factors such as bit rate or buffer constraints, toggling of optional display or coding features (e.g., at sequence level), etc. The elements can appear within an entry point header in various arrangements. The presence of some elements in the entry point header or the values of some elements may depend on the values of other elements in the entry point header or at some other level in the bitstream (e.g., sequence level elements). For example, in one implementation, the presence of an extended differential motion vector element depends on the value of an extended motion vector element.

Figure 16:
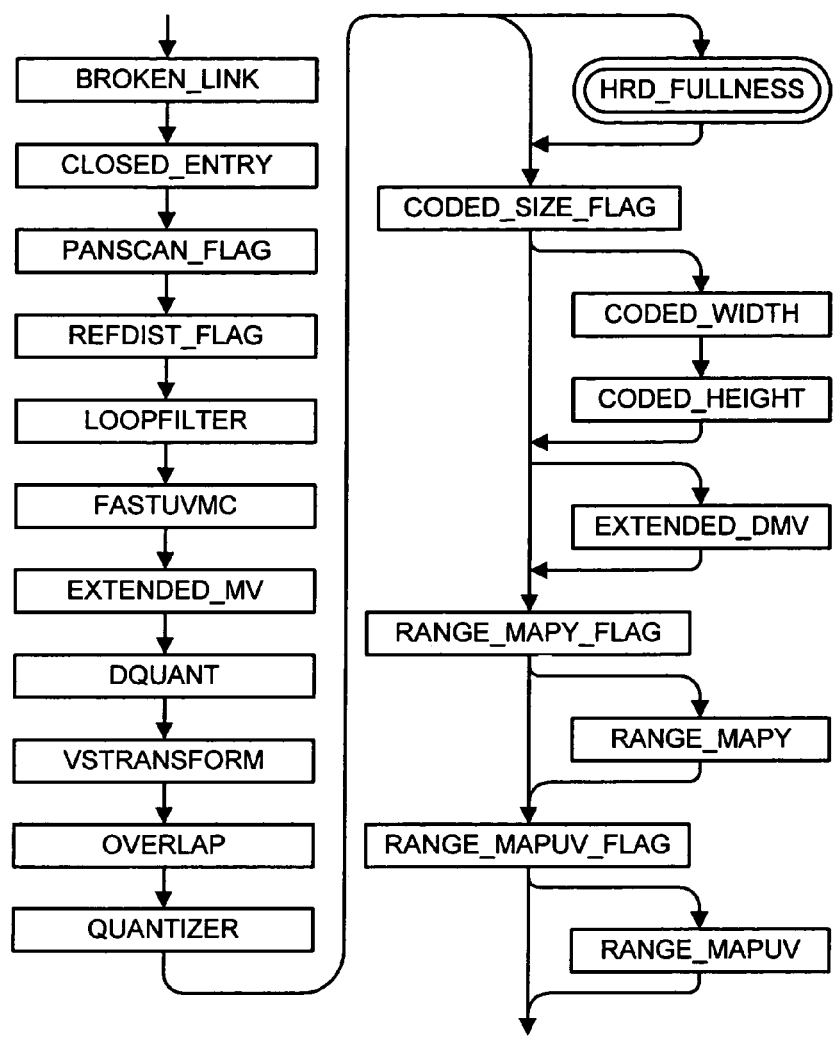
FIG. 16 is a diagram showing an entry point layer bitstream syntax in a combined implementation.

FIGS. 16, 17A and 17B show an exemplary arrangement of such bitstream elements and syntactic details for such bitstream elements in an entry point layer of a bitstream. FIG. 16 is a bitstream diagram showing the arrangement of different syntax elements within an entry point layer of a bitstream, while FIGS. 17A and 17B depict a table 1700 showing more details of the bitstream syntax for the elements shown in FIG. 16. The elements shown in these Figures are described in further detail in Section VIII, below.

VII. Trick Mode Decoding System

In some implementations, a video elementary stream includes features (e.g., entry points and other bitstream syntax elements) designed to support the implementation of video trick modes (e.g., fast forward, fast rewind, and seek modes, or other trick modes). Described embodiments improve upon complex previous decoder systems that require tight coordination between a decoder and receiver-side components processing packets and trick mode syntax elements therein.

Accordingly, various decoder-side systems for implementing trick modes are described. Various described techniques and tools can be used to process video from various sources, such as a remote server (e.g., a video-on-demand server) or from a local storage (e.g., a personal digital video recorder), and introduce trick mode effects. Described systems include at least an elementary stream decoder for decoding an elementary stream (e.g., video stream) and trick mode logic for implementing trick mode effects through receiver-side processing outside of the elementary stream decoder. This processing can be implemented in video receivers such as a PC (e.g., in a PC media center), a set-top box, or a personal digital video recorder. Described implementations provide an efficient approach for implementing trick modes in receivers.

Systems provide "on the fly" production of a trick mode elementary stream (also referred to as a trick mode bitstream) from and as a substitute for a non-trick mode elementary stream (also referred to as a non-trick mode bitstream). Systems also can generate a trick mode elementary stream offline or concurrently with conventional decoding and display of the non-trick mode version of the elementary stream. In these cases, the resulting trick mode elementary stream is stored on a local non-volatile storage in the receiver (e.g., a personal digital video recorder hard drive) or a remote server (e.g., a video-on-demand hard drive).

In described implementations, a video elementary stream (such as a Windows Media video stream, a SMPTE VC-1 elementary stream or some other elementary stream) is received and decoded by a video receiver. The video elementary stream may be encapsulated in a transport protocol stream (e.g., MPEG-2, IP/UDP/RTP, ASF, etc.) which may contain one or more elementary streams, in which case the video receiver performs de-multiplexing and de-encapsulation operations to obtain an elementary stream for subsequent decoding.

Described systems perform operations on elementary streams to introduce trick mode effects in the elementary streams. The elementary streams are then decoded as "normal" streams by an elementary stream decoder. For example, an elementary stream may include a random access/entry point element such as an entry point header for every K video frames. The value of K varies depending on underlying network and video service quality factors (e.g., tuning and channel-change latencies) that can vary depending on the video content and delivery service that an operator provides. In broadcast, satellite and cable networks, the value of K is typically 16, meaning that an entry point header is present in the bitstream approximately every half second (assuming a frame rate of 30 frames per second) and that a key frame (e.g., a progressive I-frame, interlaced I-frame, I/I-frame, I/P-frame, or P/I-frame) is provided at least approximately every half second; for example, an entry point start code and an entry point header are placed in the bitstream to signal the presence of such a key frame in the bitstream. For example, to introduce a fast-forward or fast-rewind effect in the elementary stream, assuming that the bitstream is available from a storage medium (e.g., a non-volatile storage medium such as a hard disk drive), the receiver drops all non-key frames and adds skipped frames between consecutive key frames so as to produce an elementary stream that appears to be sped up by the desired speed-up factor.

One or more trick mode processing modules in a trick mode processing branch of the receiver perform trick mode processing. Described systems process an elementary stream differently in a trick mode than in a non-trick mode (or "normal" mode). When a trick mode is entered (e.g., upon selection of a trick mode operation by a user), the systems stop sending the elementary stream directly to the elementary stream decoder and route the stream to one or more trick mode processing modules in charge of producing a substitute elementary stream that incorporates changes according to the trick mode (e.g., fast forward, pause, or some other trick mode). The elementary stream is modified by the trick mode processing module(s) to form a trick mode bitstream. The trick mode bitstream can then be decoded by the elementary stream decoder in the same way that a normal non-trick mode bitstream would be decoded, and the decoded video can be displayed in the specified trick mode.

The following examples illustrate trick mode processing modules used in a trick mode processing branch of a video receiver in some implementations. In these examples (described with reference to FIGS. 18 and 19), a video receiver system comprising the exemplary trick mode processing modules in the trick mode processing branch is referred to as "the receiver." An elementary stream decoder in the receiver is referred to as "the decoder." The trick mode processing modules shown in these examples can be rearranged, and other modules can be added or used in place of the modules shown to produce a trick mode elementary stream.

Figure 18:
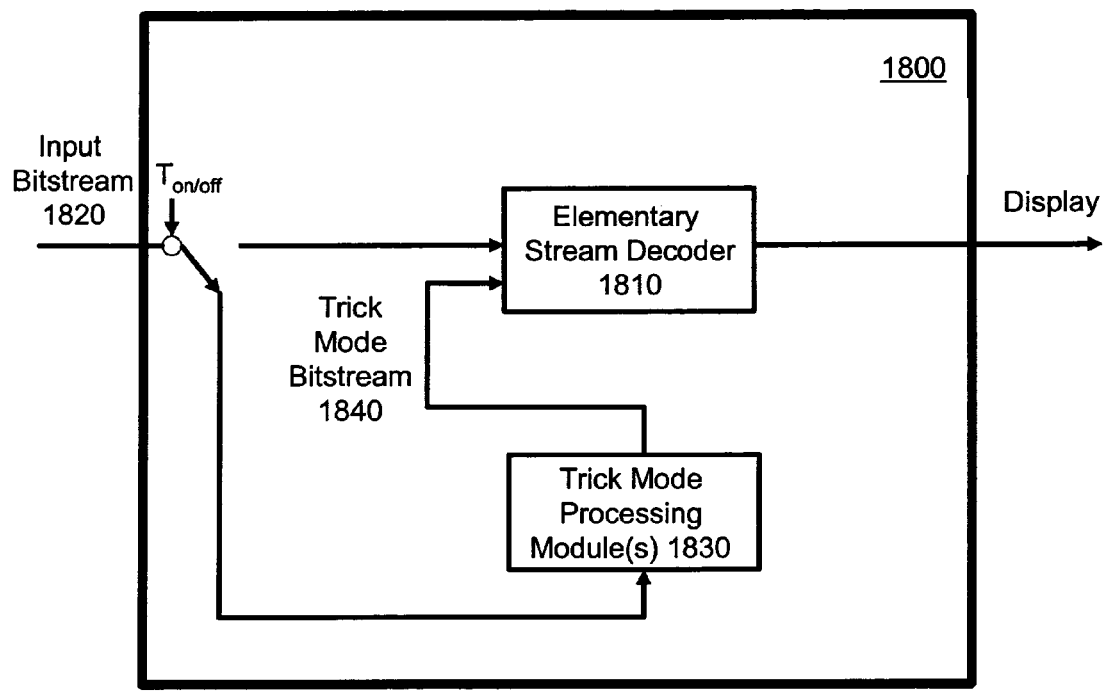
FIG. 18 is a diagram showing a video receiver system comprising one or more trick mode processing modules.

FIG. 18 is a diagram showing a video receiver system 1800 comprising an elementary stream decoder 1810 and one or more trick mode processing modules 1830. The video receiver system 1800 takes an input stream 1820 and, upon selection of a trick mode session (shown as the on/off signal "$T_{on/off}$"), routes the elementary stream to the trick mode processing module(s) 1830, which produce a trick mode bitstream 1840. The elementary stream decoder 1810 then decodes the trick mode bitstream 1840 and outputs the decoded video for subsequent display on a display device. When the trick mode session ends, the receiver system 1800 routes the input stream directly to the decoder 1810 for non-trick mode decoding and playback. Thus, the receiver system 1800 provides trick mode effects without requiring interaction or coordination with the decoder 1810.

Figure 19:
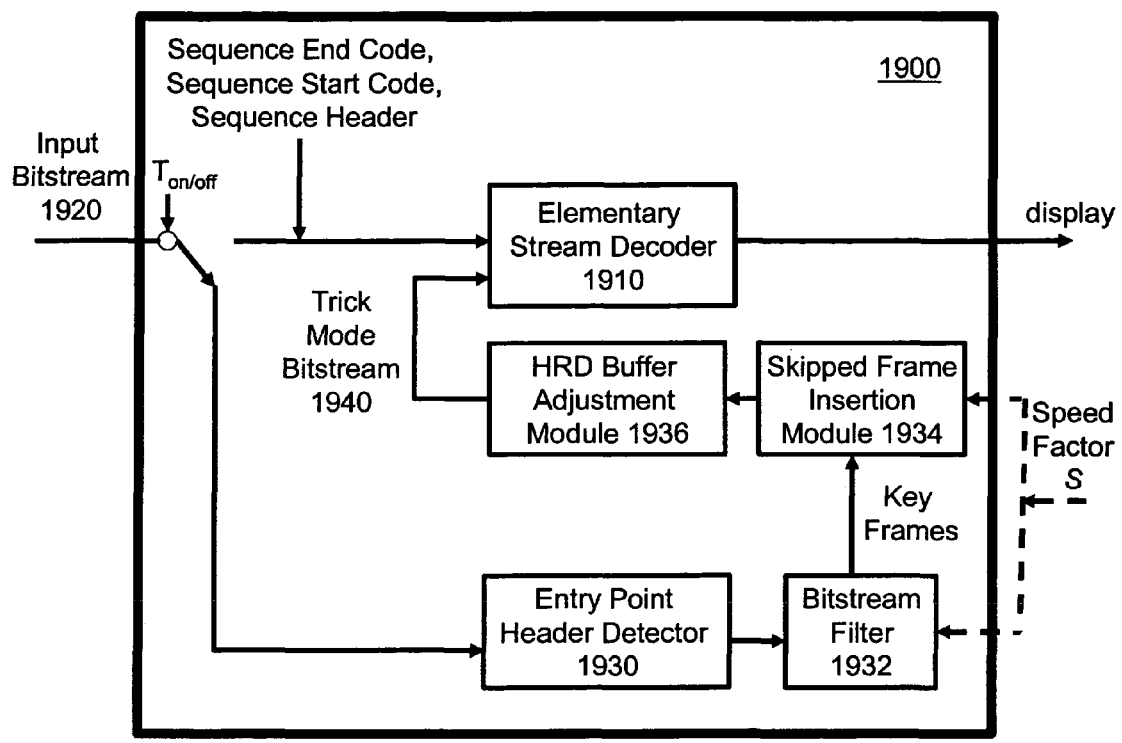
FIG. 19 is a diagram showing a detailed video receiver system comprising several trick mode processing modules.

FIG. 19 is a diagram showing a detailed video receiver system 1900 comprising trick mode processing modules 1930, 1932, 1934, and 1936. The example shown in FIG. 19 is mainly described in the context of a user-selected fast forward trick mode. However, other modes (whether user-selected or chosen in some other way) can be implemented using trick mode processing modules described in this example.

From input bitstream 1920, the receiver 1900 obtains an elementary stream. The receiver 1900 adds an end of sequence start code to the elementary stream to inform the decoder 1910 that a new bitstream is coming. At this point, the decoder 1910 waits for the next sequence header before resuming decoding. When switching to the trick mode session (as signaled by $T_{on/off}$), a sequence start code and sequence header at the beginning of the fast forward bitstream instruct the decoder 1910 to reset its elementary stream buffer characteristics (if any change is needed) and its decoding state (e.g., sequence-level decoding and display parameters, table selections, reference picture buffers, etc.). For example, decoding options specified in the prior sequence header are superseded by decoding options specified in the new sequence header.

Next, the receiver 1900 routes the elementary bitstream to the trick mode processing modules 1930, 1932, 1934, and 1936 which operate to form a trick mode bitstream 1940 from and as a replacement for (during trick mode processing) the elementary bitstream. The receiver 1900 first routes the elementary bitstream to an entry point header detector 1930. The purpose of this unit it to detect the location of entry point headers in the elementary stream. The bitstream filter 1932 keeps the key frame (e.g., the progressive I-frame, interlaced I-frame, I/I-frame, I/P-frame, or P/I-frame) after a current entry point header and removes the intermediary P-, B-, and BI-pictures (e.g., progressive frames or interlaced frames or fields) that are between the current entry point header and the subsequent entry point header (or, potentially, the end of a sequence).

The skipped frame insertion module 1934 inserts skipped progressive P-frames (progressive mode) or skipped interlaced P-frames (interlaced mode) into the trick mode bitstream 1940. A skipped frame is treated as a P-frame which is identical to its reference frame. The reconstruction of the skipped frame is equivalent conceptually to copying the reference frame—no further data is transmitted for the skipped frame. Thus, for example, the decoder 1910 reconstructs and displays the key frame, reconstructs a first skipped frame as a copy of the key frame and displays it, reconstructs a second skipped frame as a copy of the first skipped frame and displays it, and so on.

The skipped frame insertion module 1934 inserts a number of skipped frames S (treated as P-frames) between two consecutive key frames depending on a trick mode speed factor (e.g., speed-up factor) selected by the user. In one implementation, for a variable-speed fast forward trick mode the value of S is equal to 2 (for 2× speed up) or 4 (for 4× speed up). The number of skipped frames added to the trick mode bitstream 1940 is equal to (K/S)−1, as long as (K/S)−1>0. Thus, if K is 16 and S is 2, the receiver adds 7 skipped frames following each key frame to produce a 2× fast forward effect since 1 second of frames is presented in ½ second. If K is 16 and S is 4, the receiver adds 3 skipped frames following each key frame to produce a 4× fast forward effect since 1 second of frames is presented in ¼ second. If the desired speed factor is such that (K/S)−1<0, then skipped frames are not inserted. Instead, in addition to the non-key frames being dropped, one or more key frames following the current entry point header's key frame are selectively skipped to achieve the selected trick mode speed factor.

In the example shown in FIG. 19, the receiver 1900 also makes adjustments to the hypothetical reference decoder ("HRD") buffer model in the HRD buffer adjustment module 1936. In particular, for an entry point header having a buffer fullness indicator, the receiver 1900 calculates the value of the buffer fullness to prevent the elementary stream buffer in the decoder 1910 from underflow and/or overflow.

The system for producing a trick mode elementary stream can be modified to produce bitstreams corresponding to different values of S (the speed-up or speed-down factor). For example, additional pairs of skipped frame insertion and buffer adjustment modules can be added to the system in parallel as many times as needed for different values of S, with each skipped frame insertion module being tuned to provide a specific speed-up factor.

The resulting trick mode bitstream 1940 is valid as an elementary stream and is buffer-model compliant. The trick mode bitstream 1940 is then input to the decoder 1910, which decodes the key frames and skipped frames (if any). The decoded bitstream can then be displayed, thus providing the trick mode effect requested by the user.

Alternatively, for the fast forward trick mode, the bitstream filter 1932 keeps key frames and removes the some but not all intermediary predicted frames. For example, using syntax elements that indicate the number of B-frames between anchor frames or the distance between reference frames, the bitstream filter 1932 keeps P-frames but removes B-frames to implement one speed of fast forward. Original P-frames can provide a smoother motion rendition than skipped frames in video played back at higher speed. In this case, the number of skipped frames is reduced and may even be equal to 0. For example, a fast forward/rewind by a factor of 3 can be achieved by dropping every B-frame of a progressive or frame interlace entry point segment having the following pattern: IBBPBBPBBPBBPBB. For a slower fast forward, the bitstream filter 1932 keeps the P-frames and some B-frames, but removes other B-frames.

The arrangement of trick mode processing modules shown in FIG. 19 can be modified to implement other trick modes. For example, for a slow motion trick mode, a receiver can route an elementary stream to one or more bitstream modification modules to insert duplicate frames into the bitstream. For example, for a half-speed slow motion trick mode, the bitstream modification module(s) can insert one duplicate frame for each frame in the elementary stream. For a quarter-speed slow motion trick mode, the bitstream modification module(s) can insert three duplicate frames for each frame in the elementary stream. Alternatively, the bitstream modification module(s) can insert repeat-frame or repeat-field bitstream elements (or modify the values of repeat-frame or repeat-field elements already in the elementary stream) to instruct the decoder to repeat frames or fields (e.g., repeat once per frame/field for half-speed, repeat three times per frame/field for quarter-speed) to provide a slow motion effect. Or, for a slow motion trick mode, the receiver can change frame rate of the elementary stream input to the decoder but filter the output of the decoder so as to repeat the display of decoded frames for the appropriate number of times. For 2× slow motion, each frame is repeated once in processing outside of the decoder before display. For 4× slow motion, each frame is repeated twice in processing outside of the decoder before display. As for the trick mode bitstream, the frame rate, HRD buffer model parameters, and other real-world timing parameters of the trick mode bitstream are adjusted so that the same elementary stream is decoded over a longer interval of time (e.g., 2×, 4×).

As another example, for a rewind trick mode, a receiver can route an elementary stream to a module that provides independently decodable entry point segments in reverse order. The receiver finds the key frames necessary for decoding the frames to be displayed during the fast-rewind mode, including, potentially predicted frames such as progressive P- or B-frames, interlaced P- or B-frames, interlaced P/P-frames, etc., or for dropping such frames and replacing them with some number of skipped frames. One or more bitstream modification modules can then be used to indicate a modified display order for the decoded frames to be displayed in the rewind mode. For example, a predicted frame that follows a key frame in decoding order may be displayed before the key frame in a fast-rewind mode in order to provide a rewind effect on the display. The number of displayed frames can be varied depending on the speed of the rewind mode. For example, more frames can be displayed in a slower-speed rewind mode than in a faster-speed rewind mode. In one rewind mode, a receiver may send only key frames in the trick mode bitstream for display in reverse order.

As another example, for a freeze-frame trick mode, bitstream modification module(s) can insert repeat-frame or repeat-field bitstream elements (or modify the values of repeat-frame or repeat-field elements already in the elementary stream) to instruct the decoder to repeat frames or fields indefinitely during freeze-frame mode to provide a freeze-frame effect. Or, the receiver can end the trick mode bitstream after enough frames to decode the freeze frame have been included, and thereby cause suspension of decoding, but repeat the display of the freeze frame when it is output by the decoder, so as to provide the freeze frame effect. Or, for a freeze-frame trick mode in which an I- or P-frame is the freeze frame, the receiver can simply insert skipped frames indefinitely after that freeze frame in the trick mode bitstream.

As with the fast-forward mode, the resulting trick mode bitstreams for other trick modes are valid as an elementary stream to be decoded by the decoder. In cases where a specific buffer model is used, the resulting trick mode bitstreams can be adjusted to be buffer-model compliant.

VIII. Combined Implementation

A detailed combined implementation for a bitstream syntax, semantics, and decoder is now described.

A. Bitstream Syntax

In various combined implementations, data for interlaced frame coded pictures (e.g., interlaced P-frames, interlaced B-frames, interlaced I-frames, etc.) is presented in the form of a bitstream having plural layers (e.g., sequence, entry point, frame, field, macroblock, block and/or sub-block layers).

In the syntax diagrams, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Entry-point-level bitstream elements are shown in FIG. 16. In general, an entry point marks a position in a bitstream (e.g., an I-frame or other key frame) at which a decoder can begin decoding. In other words, no pictures before the entry point in the bitstream are needed to decode pictures after the entry point. An entry point header can be used to signal changes in coding control parameters (e.g., enabling or disabling compression tools, such as in-loop deblocking filtering, for frames following an entry point).

Figure 20:
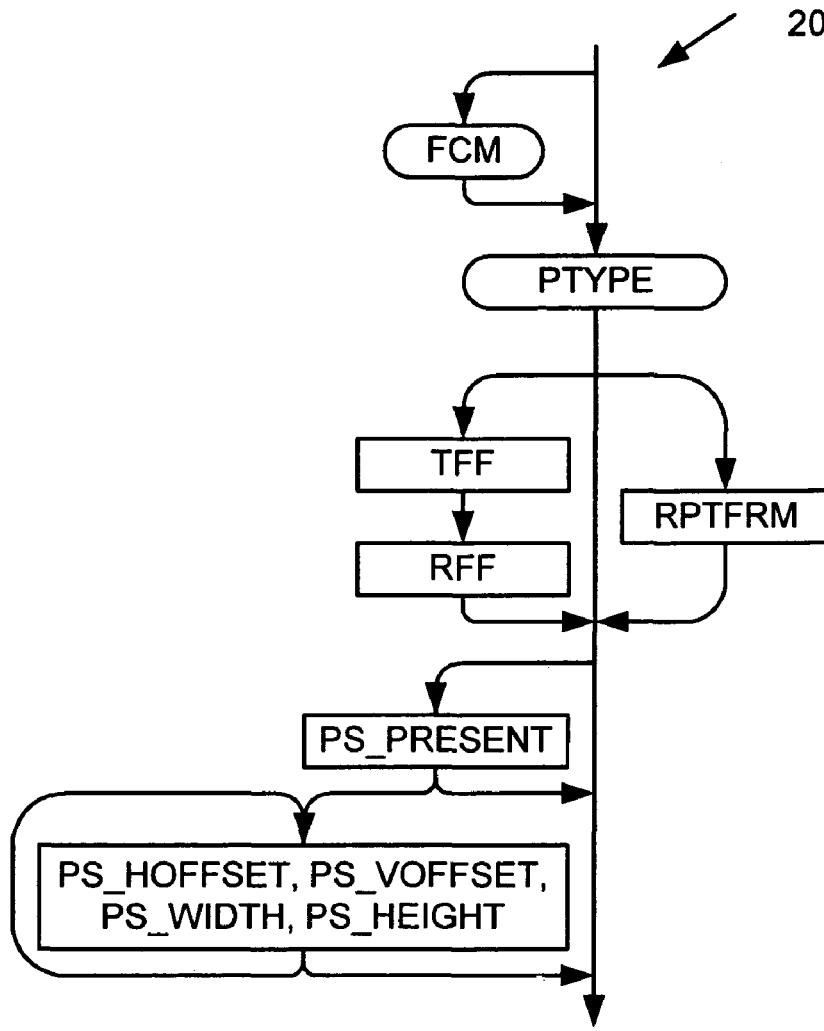
FIG. 20 is a diagram showing a frame-layer bitstream syntax for skipped frames in a combined implementation.

For progressive skipped frames, frame-level bitstream elements are shown in FIG. 20. (Frame-level bitstream elements for interlaced skipped frames are identical to those for progressive skipped frames.)

Figure 21:
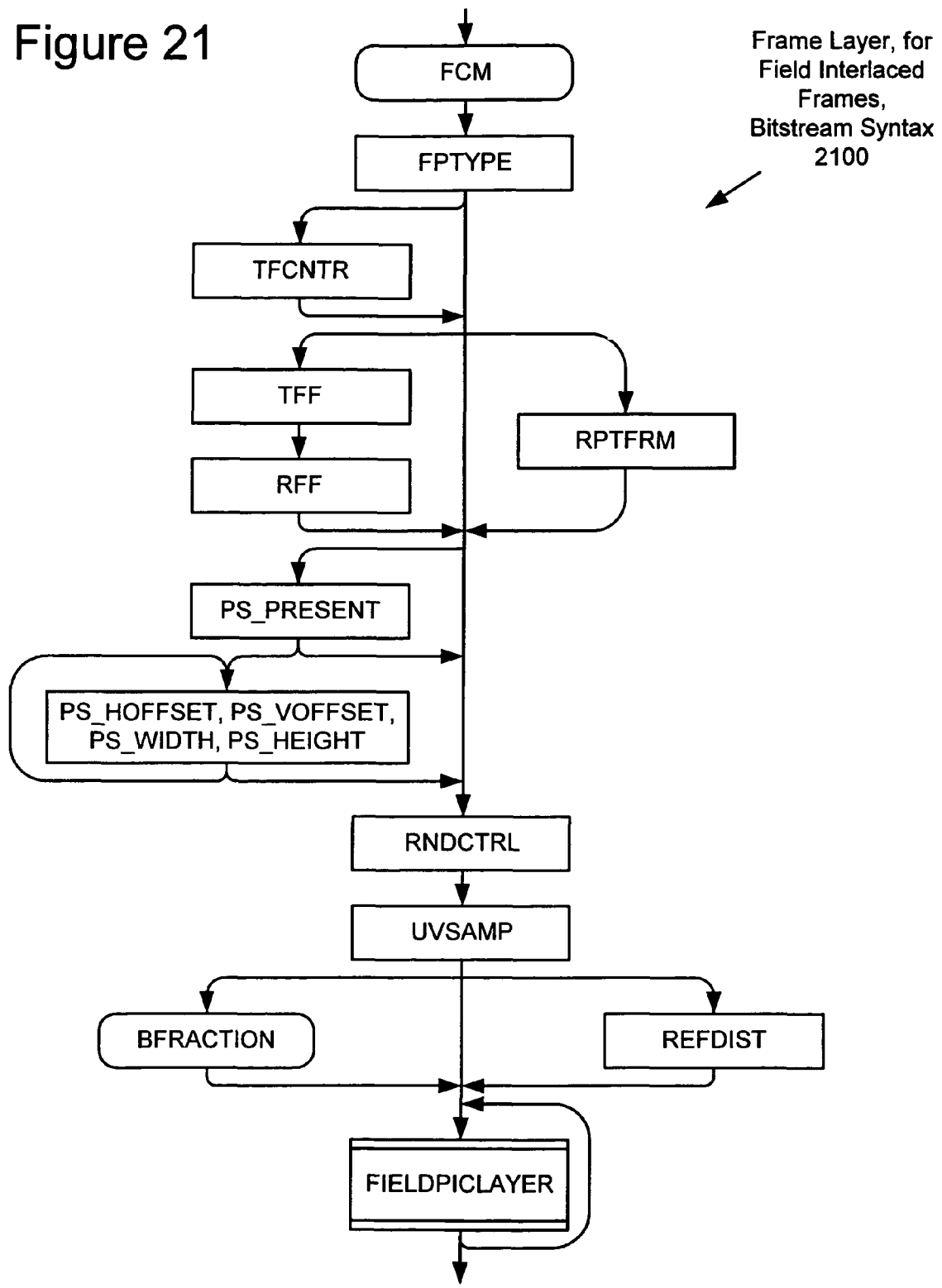
FIG. 21 is a diagram showing a frame-layer bitstream syntax for a pair of interlaced fields in a combined implementation.

For interlaced video frames with interlaced P-fields, I-fields, etc., frame-level bitstream elements are shown in FIG. 21. Data for each frame consists of a frame header followed by data for the field layers (shown as the repeated "FieldPicLayer" element per field).

Although not shown in these bitstream diagrams, start codes are used in this combined implementation to signal different features in the bitstream such as entry point segments, frames, and fields. Start codes are described in further detail above in Section IV and below in Section VIII.B and VIII.C.

The following sections describe selected bitstream elements in the frame and macroblock layers that are related to signaling for interlaced pictures. Although the selected bitstream elements are described in the context of a particular layer, some bitstream elements can be used in more than one layer.

1. Selected Entry Point Layer Elements

A bitstream diagram for an entry point layer in this combined implementation is shown in FIG. 16. Details for specific syntax elements are described below.

Closed Entry Point (CLOSED_ENTRY (1 Bit)

CLOSED_ENTRY is a 1-bit syntax element. CLOSED_ENTRY=1 indicates that the current entry point segment does not contain any B-pictures that require an I- or or P-picture in the previous entry point segment to decode. CLOSED_ENTRY=0 indicates that the entry point segment may contain B-pictures that require an I- or P-picture in the previous entry point segment to decode.

Broken Link Flag (BROKEN_LINK) (1 Bit)

BROKEN_LINK is a 1-bit syntax element. BROKEN_LINK=1 indicates that the entry point contains B-pictures which require an I- or P-picture in the previous entry point to decode, but the previous entry point is no longer present (usually because of an edit). If CLOSED_ENTRY=1 then BROKEN_LINK is undefined. If CLOSED_ENTRY=0 then BROKEN_LINK=0 indicates that the previous entry point segment required to decode any dependent B-pictures is still present.

Pan Scan Present Flag (PANSCAN_FLAG) (1 Bit)

PANSCAN_FLAG is a 1-bit syntax element. PANSCAN=1 indicates that pan/scan information is present in the picture headers within the entry point segment. PANSCAN=0 indicates that no pan/scan information is present in the picture headers within the entry point segment.

Reference Frame Distance Flag (REFDIST_FLAG) (1 Bit)

REFDIST_FLAG is a 1-bit syntax element. REFDIST_FLAG=1 indicates that the REFDIST syntax element is present in field headers for I/I-, I/P-, P/I- or P/P-frames. REFDIST_FLAG=0 indicates that the REFDIST syntax element is not present in field headers for such frames. If REFDIST_FLAG=0, REFDIST shall be set to the default value of 0. REFDIST is a variable-length code that indicates the number of frames between the current frame and the reference frame. In this combined implementation, the value of REFDIST shall be less than, or equal to, 16.

Loop Filter Flag (LOOPFILTER) (1 Bit)

LOOPFILTER is a Boolean that indicates whether loop filtering is enabled for the sequence. If LOOPFILTER=0, then loop filtering is not enabled. If LOOPFILTER=1, then loop filtering is enabled.

Fast UV Motion Compensation Flag (FASTUVMC) (1 Bit)

FASTUVMC is Boolean that controls the sub-pixel interpolation and rounding of chroma motion vectors. If FASTUVMC=1, then the chroma motion vectors that are at quarter-pel offsets will be rounded to the nearest half or full-pel positions. If FASTUVMC=0, then no special rounding or filtering is done for chroma motion vectors. The purpose of this mode is to speed optimization of the decoder.

Extended Motion Vector Flag (EXTENDED_MV) (1 Bit)

EXTENDED_MV is a Boolean that indicates whether extended motion vectors are turned on (EXTENDED_MV=1) or off (EXTENDED_MV=0).

Macroblock Quantization Flag (DQUANT) (2 Bit)

DQUANT indicates whether or not the quantization step size may vary within a frame. If DQUANT=0, then only one quantization step size (i.e. the frame quantization step size) may be used per frame. If DQUANT=1 or 2, then the quantization step size may vary within the frame. In this combined implementation, values greater than 2 are reserved.

Variable Sized Transform Flag (VSTRANSFORM) (1 Bit)

VSTRANSFORM is a Boolean that indicates whether variable-sized transform coding is enabled for the sequence. If VSTRANSFORM=0, then variable-sized transform coding is not enabled. If VSTRANSFORM=1, then variable-sized transform coding is enabled.

Overlapped Transform Flag (OVERLAP) (1 Bit)

OVERLAP is a Boolean that indicates whether overlapped transforms are used. If OVERLAP=1, then overlapped transforms are used, otherwise they are not used.

Quantizer Specifier (QUANTIZER) (2 Bits)

QUANTIZER indicates the quantizer used for the entry point segment, and indicates whether the quantizer is specified at frame level.

Hypothetical Reference Decoder Buffer Fullness (HRD_FULLNESS) (Variable Size)

In general, the HRD_PARAM_FLAG is a 1-bit flag that indicates the presence of HRD parameters in the bitstream. If this flag is 0, HRD parameters are not present. If HRD_PARAM_FLAG is 1, HRD parameters are present. For example, HRD_PARAM is a sequence-level variable-size element. It includes HRD_NUM_LEAKY_BUCKETS (a number between 0 and 31 that specifies a number of leaky buckets N in the HRD buffer), HRD_RATE[n] and BIT_RATE_EXPONENT (which define the peak transmission rate $R_n$ in bits per second for the nth leaky bucket), HRD_BUFFER[n] and BUFFER_SIZE_EXPONENT (which define the buffer size $B_n$ in bits for the nth leaky bucket).

HRD_FULLNESS is a variable size syntax element that is present in an entry point header only if an HRD_PARAM_FLAG in the sequence header is set to 1. If the HRD_PARAM_FLAG in the sequence header is set to 0, the HRD_FULLNESS syntax element is not present. HRD_FULLNESS[n] defines the decoder buffer fullness as an upwards rounded fraction of the buffer size $B_n$, in units of $B_n/256$. This element may take values in the range 1 to 256 and is encoded in binary using the 8 bit values 0 through 255 to uniformly cover the range.

Coded Size Flag (CODED_SIZE_FLAG) (1 Bit)

CODED_SIZE_FLAG is a 1-bit syntax element. CODED_SIZE_FLAG=1 indicates that the CODED_WIDTH and CODED_HEIGHT syntax elements (described below) are also present in the entry header. CODED_SIZE_FLAG=0 indicates that the CODED_WIDTH and CODED_HEIGHT syntax elements are not present in the entry header and the width and height of the frames within the entry point segment are specified by the MAX_CODED_WIDTH and MAX_CODED_HEIGHT syntax elements in the sequence header.

Coded Frame Width (CODED_WIDTH) (12 Bits)

CODED_WIDTH is a 12-bit syntax element present if CODED_SIZE_FLAG=1. It specifies the coded width of the frames within the entry point segment in units of 2 pixels. The coded width of the frames within the entry point segment is equal to the value of this field multiplied by 2, plus 2. Therefore, the range is 2 to 8192.

Coded Frame Height (CODED_HEIGHT) (12 Bits)

CODED_HEIGHT is a 12-bit syntax element present if CODED_SIZE_FLAG=1. It specifies the coded height of the frames within the entry point segment in units of 2 pixels. The coded height of the frames within the entry point segment is equal to the value of this field multiplied by 2, plus 2. Therefore, the range is 2 to 8192.

Extended Differential Motion Vector Range Flag (EXTENDED_DMV) (1 Bit)

EXTENDED_DMV is a 1-bit syntax element that is present if EXTENDED_MV=1. If EXTENDED_DMV is 1, extended differential motion vector range shall be signaled at the picture layer for the P- and B-pictures within the entry point segment. If EXTENDED_DMV is 0, extended differential motion vector range shall not be signaled.

Range Mapping Luma Flag (RANGE_MAPY_FLAG) (1 Bit)

RANGE_MAPY_FLAG is a 1-bit syntax element. If RANGE_MAPY_FLAG=1, the syntax element RANGE_MAPY is present within the entry header. Otherwise, the RANGE_MAPY syntax element is absent.

Range Mapping Luma (RANGE_MAPY) (3 Bits)

RANGE_MAPY is a 3-bit syntax element that is present if RANGE_MAPY_FLAG=1. RANGE_MAPY takes a value from 0 to 7. If the RANGE_MAPY syntax element is present, the luma components of the decoded pictures within the entry point segment are scaled according to this formula:

$$Y[n]=\text{CLIP}(((Y[n]-128)*(\text{RANGE\_MAPY}+9)+4)>>3)+128).$$

This scaling is performed after all other decoding stages (including loop filtering) have been performed. If CLOSED_ENTRY=0, the values of RANGE_MAPY_FLAG and RANGE_MAPY shall be set to the same values as those of the corresponding syntax elements in the previous entry-point segment.

Range Mapping Chroma Flag (RANGE_MAPUV_FLAG) (1 Bit)

RANGE_MAPUV_FLAG is a 1-bit syntax element. If RANGE_MAPUV_FLAG=1, the syntax element RANGE_MAPUV is present within the entry header. Otherwise, the RANGE_MAPUV syntax element is absent.

Range Mapping Chroma (RANGE_MAPUV) (3 Bits)

RANGE_MAPUV is a 3-bit syntax element that is present if RANGE_MAPUV_FLAG=1. RANGE_MAPUV takes a value from 0 to 7. If the RANGE_MAPUV syntax element is present, the chroma components of the decoded pictures within the entry point segment are scaled according to this formula:

$$C_b[n]=\text{CLIP}((C_b[n]-128)*(\text{RANGE\_MAPUV}+9)+4)>>3)+128);$$

$$C_r[n]=\text{CLIP}(((C_r[n]-128)*(\text{RANGE\_MAPUV}+9)+4)>>3)+128);$$

This scaling is performed after all other decoding stages (including loop filtering) have been performed.

If CLOSED_ENTRY=0, the values of RANGE_MAPUV_FLAG and RANGE_MAPUV shall be set to the same values as those of the corresponding syntax elements in the previous entry-point segment.

2. Selected Frame Layer Elements
Frame Coding Mode (FCM) (Variable Size)

FCM is a variable length codeword ["VLC"] used to indicate the picture coding type. FCM is described in further detail in Section V, above. FCM takes on values for frame coding modes as shown in Table 3 below:

TABLE 3

| Frame Coding Mode VLC | |
|---|---|
| FCM value | Frame Coding Mode |
| 0 | Progressive |
| 10 | Frame-Interlace |
| 11 | Field-Interlace |

Field Picture Type (FPTYPE) (3 Bits)

FPTYPE is a three-bit syntax element present in the frame header for a frame including interlaced P-fields, interlaced I-fields, interlaced B-fields, and/or interlaced BI fields. FPTYPE takes on values for different combinations of field types in the interlaced video frame. FPTYPE is described in further detail in Section V, above.

Picture Type (PTYPE) (Variable Size)

PTYPE is a variable size syntax element present in the frame header for progressive and interlaced frames. PTYPE takes on values for different frame types according to Table 4 below.

TABLE 4

| Picture Type VLC | |
|---|---|
| PTYPE VLC | Picture Type |
| 110 | I |
| 0 | P |
| 10 | B |
| 1110 | BI |
| 1111 | Skipped |

If PTYPE indicates that the frame is skipped then the frame is treated as a P-frame that is identical to its reference frame. The reconstruction of the skipped frame is equivalent conceptually to copying the reference frame. A skipped frame means that no further image data is transmitted for this frame, although additional data may be sent relating to display of the frame (e.g., display ordering or repeat field/repeat frame data).

B. Start Codes and Emulation Prevention

In this combined implementation, the beginning of a Bitstream Data Unit (BDU) of compressed video data is signaled with an identifier called a Start Code (SC). A BDU could be, for example, a sequence header, a picture header, or a slice (see Table 6, below, for a complete list).

This combined implementation defines a sequence of four bytes as the start code, which consists of a unique three-byte Start Code Prefix (SCP) and a one-byte Start Code Suffix (SCS). The SCP shall be the unique sequence of three bytes (0x000001). The SCS is used to identify the type of BDU that follows the start code. For example, the suffix of the start code before a picture is different from the suffix of the start code before a slice. In this combined implementations, start codes are always byte-aligned.

An Encapsulation Mechanism (EM) prevents emulation of the start code prefix in the bitstream. The compressed data before encapsulation is called a Raw Bitstream Decodable Unit (RBDU), while an Encapsulated BDU (EBDU) refers to the data after encapsulation.

The EM process for encapsulation of an RBDU to obtain an EBDU is described below.

Step 1: If the RBDU is not null, the EM appends a trailing '1' bit to the end of the RBDU and then stuffs between 0 and 7 bits onto the end of the BDU such that the BDU ends in a byte-aligned location. The value of these stuffing bits is '0'. As a result, at the end of this step, the BDU is represented in an integer number of bytes, in which the last byte of the BDU, if present, cannot be a zero-valued byte. The resulting string of bytes is called the payload bytes of the BDU.

Step 2: The encoder can begin an EBDU with any number of zero-valued bytes at the beginning of the EBDU.

Step 3: The start code is formed by starting with the three-byte start code prefix (0x000001), and appending the appropriate start code suffix that identifies the BDU type as specified in Table 6, below. If no additional zero-valued bytes were placed at the beginning of the EBDU, the start code is placed at the beginning of the EBDU. Otherwise, the start code is placed after the zero-valued bytes that were placed at the beginning of the EBDU.

Step 4: The remainder of the EBDU is formed by processing the payload bytes of the BDU through an emulation prevention process as follows, and appending the resulting string of bytes in the EBDU after the start code. The emulation of start code prefixes within the payload bytes of the BDU is eliminated via byte stuffing. The emulation prevention process is performed by starting at the beginning of the payload bytes of the BDU, and replacing each three-byte data string within the payload that consists of two consecutive bytes of value 0x00 followed by a byte that contains zero values in its six MSBs (regardless of the LSB values) with two bytes of value 0x00 followed by a byte equal to 0x03 followed by a byte equal to the last byte of the original three-byte data string. This process is illustrated in Table 4, below.

TABLE 4

| Emulation Prevention Pattern Replacement | |
|---|---|
| Pattern to Replace | Replacement Pattern |
| 0x00, 0x00, 0x00 | 0x00, 0x00, 0x03, 0x00 |
| 0x00, 0x00, 0x01 | 0x00, 0x00, 0x03, 0x01 |
| 0x00, 0x00, 0x02 | 0x00, 0x00, 0x03, 0x02 |
| 0x00, 0x00, 0x03 | 0x00, 0x00, 0x03, 0x03 |

Step 5: The encoder can end an EBDU with any number of zero-valued bytes at the end of the EBDU.

Except for the first EBDU and the last EBDU, the decoder cannot distinguish between prepended zero-valued bytes inserted in step 2 and appended zero-valued bytes inserted in step 5. Encoders that produce bitstreams used in application environments in which it is possible for byte alignment to be lost as a result of errors in bitstream transmission would add some zero-valued bytes in step 2 or step 5 at least occasionally, as these extra bytes assist in byte alignment recovery for decoders. For example, adding one extra zero-valued byte at the beginning of each sequence header, entry point header, and picture header is desirable in such application environments. The addition of zero-valued stuffing bytes can also be useful for splicing bitstreams, filling a constant bit-rate channel when sufficient picture quality has already been attained, etc. The zero-valued stuffing bytes inserted in step 2 or step 5 are not processed through the emulation prevention mechanism—only the bytes containing the RBDU or the byte-alignment stuffing bits appended to the end of the RBDU in step 1 need such processing.

1. Detection of Start Codes and EBDU

In this combined implementation, the detection of an EBDU starts with the search for the start code prefix.

Detection of Start Codes Starting from Byte-Aligned Positions

In a decoder that cannot lose byte-alignment, or once byte alignment has been established, start code detection in this combined implementation shall be conducted by scanning the byte stream to detect the location of two or more consecutive byte-aligned bytes of value 0x00 followed by a byte of value 0x01. A start code prefix detection is declared for each such detected three-byte string.

In many application environments, the bitstream data is carried in an inherently byte aligned manner and thus byte alignment loss and recovery is not an issue. Since byte alignment is defined in relation to the location of the start of the bitstream, byte alignment is considered to always be unambiguously established for the decoding of correct and error-free conforming bitstreams.

When two successive start codes prefixes have been detected, the data bytes of the byte stream starting with the first byte of the first of the two start code prefixes and ending with the last byte prior to the first byte of the second of the two start code prefixes shall be considered to an EBDU.

Detection of Start Codes and Byte-Alignment Recovery After Loss of Byte Alignment In a decoder that has lost byte-alignment (as can happen in some transmission environments), start code prefix detection and byte-alignment detection are conducted as follows. Starting at any alignment position, the decoder scans the byte stream data in a byte-wise fashion. Whenever a string of three or more consecutive bytes of value 0x00 is found, followed by any non-zero byte, a start code prefix detection is declared and byte alignment is understood to have been recovered such that the first non-zero bit in the non-zero byte will be the last bit of a byte-aligned start code.

The presence of extra zero-valued bytes prior to some start codes (or, equivalently, appended onto the end of some preceding EBDUs) is useful for ensuring that this process will result in byte alignment recovery.

2. Extraction of RBDU from EBDU

The decoder shall perform the extraction process of an RBDU from an encapsulated BDU as described below.

Step 1: The start code suffix is used to identify the type of BDU. The bytes that follow the start code suffix shall then be further processed as follows.

Step 2: The decoder shall remove all zero-valued bytes at the end of EBDU. After this step, if the BDU payload after the start code suffix is not null, the last byte of the BDU will contain the '1' bit and any byte-aligning '0' bits that are present after the end of the RBDU.

Step 3: The bytes used for emulation prevention shall be detected and removed according to the following process: Whenever a string of two consecutive bytes of value 0x00 are followed by a byte equal to 0x03, the byte equal to 0x03 is understood to be an emulation prevention byte and is discarded. This process is illustrated in Table 5.

TABLE 5

Decoder Removal of Emulation Prevention Data

| Pattern to Replace | Replacement Pattern |
|---|---|
| 0x00, 0x00, 0x03, 0x00 | 0x00, 0x00, 0x00 |
| 0x00, 0x00, 0x03, 0x01 | 0x00, 0x00, 0x01 |
| 0x00, 0x00, 0x03, 0x02 | 0x00, 0x00, 0x02 |
| 0x00, 0x00, 0x03, 0x03 | 0x00, 0x00, 0x03 |

Step 4: If there are bytes not removed in step 2 that follow the start code suffix in the EBDU, in the last byte of the BDU data processed in step 3, the last non-zero bit is identified, and that non-zero bit, and all the zero bits that follow, shall be discarded. The result is the RBBU. If there are no bytes not removed in step 2 that follow the start code suffix in the EBDU, the RBDU shall be considered null.

3. Constraints on Byte Stream Data Patterns

In this combined implementation, the following byte patterns shall not be present at a byte-aligned position within the bitstream:

a) A string of two consecutive bytes of value 0x00 followed by a byte equal to 0x02.

b) A string of three or more consecutive bytes of value 0x00, if not followed by a byte of value 0x01.

c) A string of two consecutive bytes of value 0x00, followed by a byte of value 0x03, followed by a byte that has a value that is not one of 0x00, 0x01, or 0x02, or 0x03.

The encapsulation process described above can prevent these data patterns. The detection of these data patterns by a decoder should be considered an indication of an error condition. A loss of byte alignment should also be considered an error condition. For decoders operating in application environments in which decoder byte alignment can be lost, the detection of such error conditions should be used as an indication that byte alignment may have been lost.

4. Start code Suffixes for BDU Types

In this combined implementation, the start code suffixes for various BDU types are presented in Table 6.

TABLE 6

Start Code Suffixes for Various BDU Types

| Start code Suffix | BDU Type |
|---|---|
| 0x0F | Sequence Header |
| 0x0E | Entry-point Header |
| 0x0D | Frame |
| 0x0C | Field |
| 0x0B | Slice |
| 0x1F | Sequence Level User Data |
| 0x1E | Entry-point Level User Data |
| 0x1D | Frame Level User Data |
| 0x1C | Field Level User Data |
| 0x1B | Slice Level User Data |
| 0x0A | End-of-Sequence |
| 0x00 | Reserved |
| 0x01-0x09 | Reserved |
| 0x10-0x1A | Reserved |
| 0x20-0x7F | Reserved |
| 0x80-0xFF | Forbidden |

The Sequence Header BDU type is sent to identify BDUs which carry a sequence header. The Entry-point Header BDU type is sent to identify BDUs which carry an entry-point header. The Picture BDU type is sent to identify BDUs which contain a picture header and picture data. The Field BDU type is sent to identify BDUs which contain the second field of a picture that is coded as two separate fields. The Slice BDU type is sent to identify BDUs which carry slice data and a slice header.

Sequence Level User Data, Entry-point Level User Data, Frame Level User Data, Field Level User Data, and Slice Level User Data BDU types are used to transmit any user defined data associated with the Sequence, Entry-point, Frame, Field, and Slice respectively.

"End-of-sequence" is an optional BDU type which indicates that the current sequence has ended, and no further data will be transmitted for this sequence. Note that the transmission of an "end-of-sequence" may be present, but the end of a sequence shall be inferred from the header of the next sequence.

C. Start Code Details

In this combined implementation, there are 11 distinct start code values: sequence start code, entry start code, frame start code, field start code, slice start code, end-of-sequence start code and five values for user data start codes. Each start code is a 32-bit field. For user data, the value of the start code defines the scope of the user data.

In this combined implementation, bitstreams are constructed according to the constraints below.

FIGS. 22-25 reference bitstream constructs defined as follows:

| | |
|---|---|
| SEQ_SC | Sequence Start Code |
| SEQ_HDR | Sequence Header |
| ENTRY_SC | Entry Point Start Code |
| ENTRY_HDR | Entry Point Header |
| FRM_SC | Frame Start Code |
| FRM_DAT | Frame Data (includes a Frame Header) |
| FLD_SC | Field Start Code |
| FLD1_DAT | Field 1 Data (includes a Frame Header) |
| FLD2_DAT | Field 2 Data (includes a Field Header) |

A conformant bitstream in this combined implementation is one with any combination of the above start codes and header pairs (and potentially other elements such as slice headers, slice data, user data start codes and user data bytes) in any order that conforms to the syntax constraints described in this combined implementation. A conformant picture-producing bitstream is one that contains at least one pair of SEQ_SC and SEQ_HDR, at least one pair of ENTRY_SC and ENTRY_HDR, and for each picture, a pair of FRM_SC and FRM_DAT or a 4-tuple of FLD_SC, FLD1_DAT, FLD_SC, and FLD2_DAT.

In this combined implementation, a picture producing bitstream is further constrained according to the following construction rules.

1. Sequence Start Code

In this combined implementation, a sequence start code (value 0x0000010F) is followed immediately by a sequence header. A sequence header is followed by a user data start code or an entry point start code or a frame start code.

2. Entry Point Start Code

In this combined implementation, an entry point start code (value 0x0000010E in this combined implementation) is followed immediately by an entry point header. In a bitstream, any entry point start code is located after the last byte of a video frame and before the beginning of the next video frame. If there is a need to insert an entry point header or an entry point start code and an entry point header where there is already a sequence header between two consecutive video frames, the entry point header code or the entry point start code and the entry point header follows the sequence header. An entry point header is followed by a user data start code or a frame start code.

An entry point start code and an entry point header may be inserted at regular or irregular intervals in the bitstream. Therefore, an encoder can adopt various policies to govern the insertion of entry point start codes and associated headers in a bitstream.

The purpose of the entry point start code is to signal the presence of special locations in a bitstream where there is no dependency on past decoded video fields or frames to decode the video frame following immediately the entry point start code and header. The conditions for achieving this are listed below. These conditions depend on the type of the first frames/fields past the entry point. The type of the first frame or first two fields following an entry point start code and an entry point header is I if picture coding type is set to Progressive or Frame Interlace, or I and P (I/P), P and I (P/I), or I and I (I/I) if the picture coding type is set to Field Interlace.

Progressive I-Frame

Figure 22:
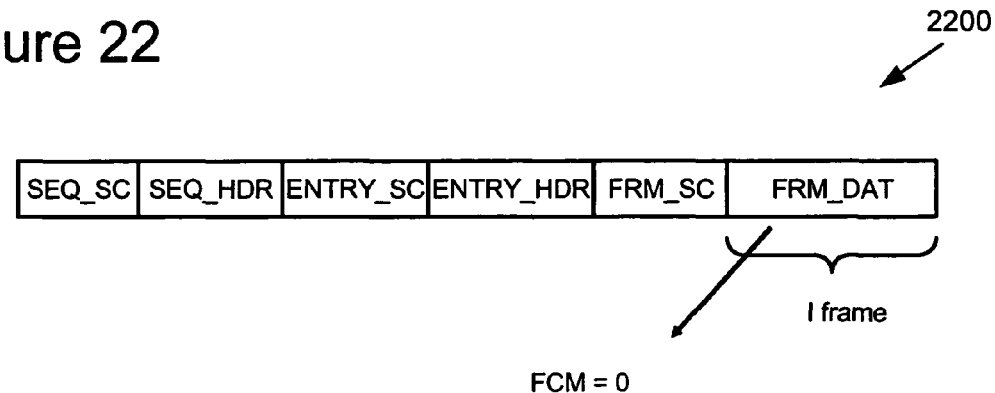
FIG. 22 is a diagram showing a portion of a bitstream with a progressive I-frame entry point in a combined implementation.

FIG. 22 shows a bitstream syntax 2200 that illustrates how an entry point start code and an entry point header may be present before an I-frame when the Picture Coding Type (FCM field) is set to '0' (Progressive mode).

Since the frame is intra-coded, no additional condition is needed to make this progressive I-frame a valid entry point in a bitstream. In this combined implementation, the entry point applies to the I-frame that follows the entry point start code and header but it does not apply to any B-frame data or B-field data that follows that progressive I-frame in the bitstream and for which the presentation time comes earlier than the presentation time for that progressive I-frame.

I/P-Frame

Figure 23:
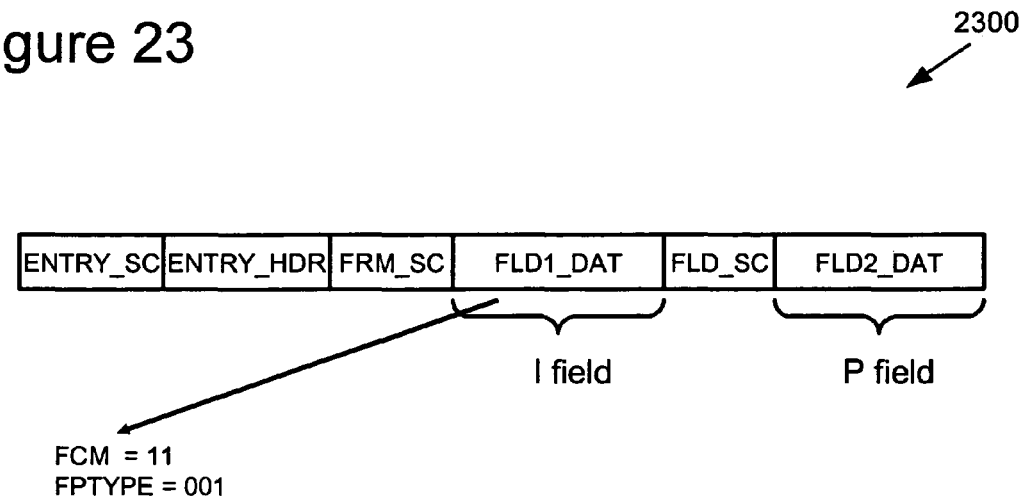
FIG. 23 is a diagram showing a portion of a bitstream with an interlaced I/P-frame entry point in a combined implementation.

FIG. 23 shows a bitstream syntax 2300 that illustrates how an entry point start code and header may be present in this combined implementation before an I/P-frame (Picture Coding Type (FCM) is set to '10' (Field Interlace mode)).

Since the frame is made of an I-field followed by a P-field, the following conditions shall be met in this combined implementation to make this I/P-frame a valid entry point in a bitstream:

The value of the NUMREF field in the field header of the interlaced P-field of the entry I/P-frame shall be '0'.

The value of the REFFIELD field in the field header of the interlaced P-field of the entry I/P-frame shall be '0'.

These conditions ensure that the P-field is only predicted from the I-field and therefore there is no dependency on frames or fields before the entry point.

The entry point applies to the I/P-frame that follows the entry point start code and header but it does not apply to any B-frame data or B-field data that follows the I/P-frame in the bitstream and for which the presentation time comes earlier than the presentation time for the I/P-frame.

P/I-Frame

FIG. 15 shows a bitstream syntax 1500 that illustrates how an entry point start code and header may be present in this combined implementation before a P/I-frame when the Picture Coding Type (FCM) is set to '10' (Field Interlace mode).

Since the frame is made of a P-field followed by an I-field, the following conditions shall be met in this combined implementation to make this P/I-frame a valid entry point in a bitstream:

Following the entry I-field, a field interlaced P/P-frame shall be present in the bitstream before any occurrence of progressive P-frames or interlaced P-frames.

The value of the NUMREF field in the field header of the first P-field following the entry P/I-frame shall be '0'.

The value of the REFFIELD field in the field header of the first P-field following the entry P/I-frame shall be '0'.

Any B-frames following the entry P/I-frame in the bitstream and for which the presentation time comes later than the presentation times for that entry P/I-frame shall not be encoded as depending on the P/I-frame.

The first (in temporal order) B-field of any B/B-frames following the entry P/I-frame in the bitstream and for which the presentation time comes later than the presentation times of that P/I-frame shall not be encoded as depending on the P-field of the entry P/I-frame.

These conditions ensure that the next P/P-frames, B-frames and B/B-frames in the bitstream are only predicted from the entry I-field and not the P-field that immediately precedes it.

In this combined implementation, it is impossible to have a valid entry point if there is a P-frame that has been predicted from the P/I-frame since this creates a dependency on the P-field of the entry P/I-frame.

The entry point applies to the I-field that follows the entry point start code and header but it does not apply to any B-frames data that follow that I-field in the bitstream and for which the presentation time is earlier than the presentation time for that I-field. Furthermore, the entry point does not apply to the P-field data located between the entry point start code and the following I-field.

I/I-Frame

Figure 24:
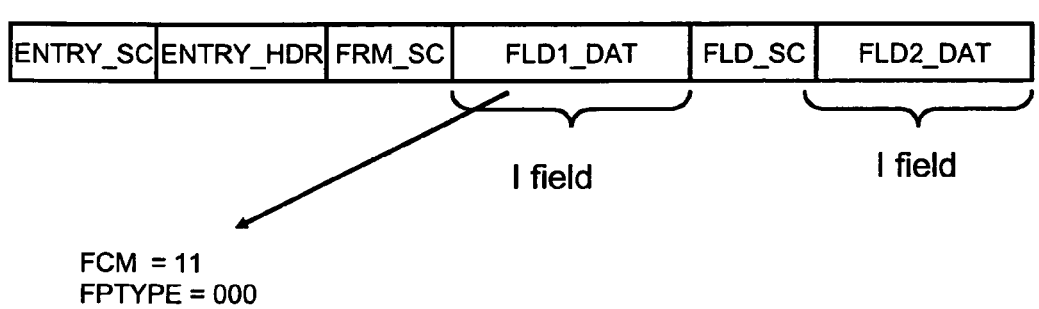
FIG. 24 is a diagram showing a portion of a bitstream with an interlaced I/I-frame entry point in a combined implementation.

FIG. 24 shows a bitstream syntax 2400 that illustrates how an entry point start code and header may be present before a I/I-frame in this combined implementation when the Picture Coding Type (FCM) is set to '10' (Field Interlace mode). FIG. 24 does not show a sequence start code and a sequence header before the entry point start code but such structures may precede the entry point start code.

Since the I/I-frame is made of two I-fields, no additional condition is needed to make the I/I-frame a valid entry point in a bitstream. In this combined implementation, the entry point applies to the I/I-frame that follows the entry point start code and header but it does not apply to any B-frame data or B-field data that follows the I/I-frame in the bitstream and for which the presentation times come earlier than the presentation times for the I/I-frame.

Interlaced I-Frame

Figure 25:
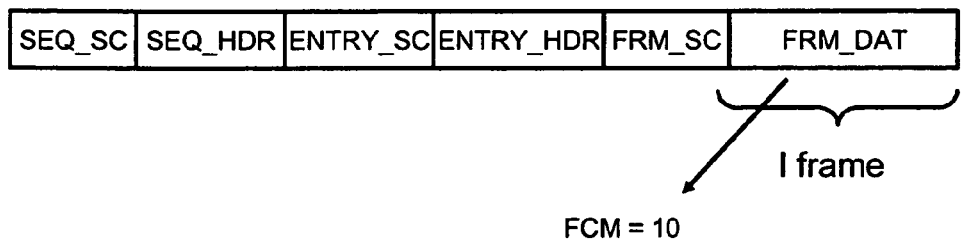
FIG. 25 is a diagram showing a portion of a bitstream with an interlaced I-frame entry point in a combined implementation.

FIG. 25 shows a bitstream syntax 2500 that illustrates how an entry point start code and header may be present in this combined implementation before an interlaced I-frame when the Picture Coding Type (FCM) is set to '11' (Frame Interlace mode).

Since the interlaced I-frame is intra-coded, no additional condition is needed to make the interlaced I-frame a valid entry point in a bitstream. In this combined implementation, the entry point applies to the interlaced I-frame that follows the entry point start code and header but it does not apply to any B-frame data or B-field data that follows the interlaced I-frame in the bitstream and for which the presentation time comes earlier than the presentation time for the interlaced I-frame.

3. Frame Start Code

In this combined implementation, a frame start code (value 0x0000010D in this combined implementation) is followed immediately by a frame header. In a bitstream, any frame start code is located after the last byte of a frame and before the beginning of the next frame. In the case of the Progressive or Frame Interlace mode, a frame start code signals the beginning of a new video frame. In the case of the Field Interlace mode, a frame start code signals the beginning of a sequence of two independently coded fields.

4. Field Start Code

In this combined implementation, a field start code (value 0x0000010C in this combined implementation) is followed immediately by a field header. The field start code shall only be used for Field Interlaced frames and shall only be used to signal the beginning of the second field of the frame. The use of field start codes is optional in Field Interlace frames. The use of field start codes is forbidden in any frames encoded according to a Progressive or a Frame Interlace mode.

5. Entry Point-Level User Data

As a general rule, entry point-level user data is located in the bitstream after the entry point-level header and immediately before the start code signaling the beginning of the start code for the next Independently Decoded Unit (IDU)—that is, the start code signaling the next frame, the next entry point or the next sequence. Flushing bits and padding bytes may precede the first byte of the user data start code. Padding bytes may precede the first byte of the start code immediately following the last user data byte (that is, the flushing byte of value 0x80).

Entry point-level user data is applicable to the sequence of video frames in the bitstream until another entry point start code or a sequence start code is encountered.

6. Start Code Usage Rules

In this combined implementation, immediate (one after another of the same kind) duplication of sequence, entry point, frame, field or slice start code and header is not allowed. User data start codes and user bytes may be duplicated an arbitrary amount of time and at any level. Use of sequence, entry point, frame, field and slice start codes is optional. Many considerations may drive the use of start codes. For example, entry start points may be used for facilitating receiver tuning or implementation of trick modes or splicing, as described above.

To facilitate implementation of trick modes in this combined implementation, the following additional constraint is observed:

1. If a sequence start code or an entry point start code is present in the bitstream immediately before the header of a field interlaced P/I-frame, then a field start code shall be present between the last data byte of the first P-field and the field header of the second I-field.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computing device that implements a video encoder, the computing device including a processor and memory, a method comprising:

with the computing device that implements the video encoder, in a bitstream comprising plural layers, inserting plural different entry point segment control parameters in an entry point header below sequence layer but above picture layer in the bitstream, each of the plural different entry point segment control parameters affecting decoding or display of one or more pictures in an entry point segment of the bitstream, wherein the plural different entry point segment control parameters comprise:
a pan scan on/off parameter that indicates whether pan scan information is present,
a reference frame distance on/off parameter that indicates whether a reference frame distance syntax element is present in respective picture headers for selected types of pictures within the entry point segment,
a loop filtering on/off parameter that indicates whether loop filtering is enabled,
a fast chroma motion compensation on/off parameter that controls rounding of chroma motion vectors,
an extended range motion vector on/off parameter that indicates whether extended range motion vectors are enabled,
a variable sized transform on/off parameter that indicates whether variable sized transform coding is enabled,
an overlapped transform on/off parameter that indicates whether overlapped transforms are used,
a quantization decision parameter that indicates whether quantization step size is variable within a picture, and
an extended differential motion vector coding on/off parameter that indicates whether use of extended range coding of differential motion vector information is signaled for selected types of pictures within the entry point segment; and
with the computing device that implements the video encoder, outputting the entry point header as part of the bitstream.

2. The method of claim 1 wherein the plural layers comprise an entry point layer, and wherein the entry point header is in the entry point layer.

3. The method of claim 1 wherein the entry point segment comprises an entry point key frame, and wherein the entry point key frame is a P/I-frame.

4. In a computing device that implements a video decoder, the computing device including a processor and memory, a method comprising:
receiving, at the computing device that implements the video decoder, an entry point header comprising plural control parameters for an entry point segment corresponding to the entry point header, wherein the entry point header is in an entry point layer of a bitstream comprising plural layers, the plural layers also including sequence layer and picture layer, and wherein the plural control parameters include:
a pan scan on/off parameter that indicates whether pan scan information is present,
a reference frame distance on/off parameter that indicates whether a reference frame distance syntax element is present in respective picture headers for selected types of pictures within the entry point segment,
a loop filtering on/off parameter that indicates whether loop filtering is enabled,
a fast chroma motion compensation on/off parameter that controls rounding of chroma motion vectors,
an extended range motion vector on/off parameter that indicates whether extended range motion vectors are enabled,
a variable sized transform on/off parameter that indicates whether variable sized transform coding is enabled,
an overlapped transform on/off parameter that indicates whether overlapped transforms are used,
a quantization decision parameter that indicates whether quantization step size is variable within a picture,
a quantizer type parameter that indicates a quantizer used, and
an extended differential motion vector coding on/off parameter that indicates whether use of extended range coding of differential motion vector information is signaled for selected types of pictures within the entry point segment;
with the computing device that implements the video decoder, decoding the entry point header; and
with the computing device that implements the video decoder, decoding one or more pictures in the entry point segment based at least in part on the plural control parameters.

5. The method of claim 4 wherein the plural control parameters further comprise a broken link parameter.

6. The method of claim 4 wherein the plural control parameters further comprise a closed entry parameter.

7. The method of claim 4 wherein the quantization decision parameter indicates one or more layers of signaling for quantization step sizes.

8. The method of claim 4 wherein the quantization type parameter indicates a quantizer type for frames in the entry point segment.

9. The method of claim 4 wherein the plural control parameters further comprise one or more coded picture size parameters.

10. The method of claim 4 wherein the plural control parameters further comprise one or more range mapping parameters indicating how to scale samples of the one or more pictures in the entry point segment after decoding.

11. The method of claim 10 wherein the one or more range mapping parameters comprise a luma range mapping parameter indicating how to scale luma samples of the one or more pictures in the entry point segment after decoding.

12. The method of claim 10 wherein the one or more range mapping parameters comprise a chroma range mapping parameter indicating how to scale chroma samples of the one or more pictures in the entry point segment after decoding.

13. The method of claim 4 wherein the plural control parameters further comprise a hypothetical reference decoder buffer parameter.

14. In a computing device that implements a video decoder, the computing device including a processor and memory, a method comprising:
receiving, at the computing device that implements the video decoder, an entry point header comprising plural control parameters for an entry point segment corresponding to the entry point header, the entry point segment comprising plural frames, wherein the entry point header is signaled in a bitstream at entry point layer below sequence layer but above frame layer that includes frame layer syntax elements for the plural frames; and
with the computing device that implements the video decoder, decoding the entry point header;
wherein the plural control parameters comprise at least:
a reference frame distance on/off parameter that indicates whether a reference frame distance syntax element is present per frame for selected types of frames within the entry point segment;

a loop filtering on/off parameter that indicates whether loop filtering is enabled;

a fast chroma motion compensation on/off parameter that controls rounding of chroma motion vectors;

an extended range motion vector on/off parameter that indicates whether extended range motion vectors are enabled;

a variable sized transform on/off parameter that indicates whether variable sized transform coding is enabled;

an overlapped transform on/off parameter that indicates whether overlapped transforms are used; and a quantization decision parameter that indicates whether quantization step size is variable within a picture.

15. The method of claim 14 wherein the plural control parameters further comprise an extended differential motion vector coding on/off parameter that indicates whether use of extended range coding of differential motion vector information is signaled for selected types of frames within the entry point segment.

16. The method of claim 14 wherein the plural control parameters further comprise a pan scan on/off parameter that indicates whether pan scan information is present in headers for frames within the entry point segment.

17. The method of claim 14 wherein the plural control parameters further comprise a flag indicating whether a range mapping parameter is present in the entry point header.

18. The method of claim 17 wherein the range mapping parameter is a luma range mapping parameter that indicates how to scale luma samples of the one or more frames in the entry point segment after decoding.

19. The method of claim 17 wherein the range mapping parameter is a chroma range mapping parameter that indicates how to scale chroma samples of the one or more frames in the entry point segment after decoding.

20. The method of claim 14 wherein, for a current frame of the plural frames in the entry point segment, the reference frame syntax element indicates a distance between the current frame and a reference frame.

21. The method of claim 14 wherein the selected types of frames for which the reference frame distance syntax element is present are I/I, I/P, P/P and P/I type frames in the entry point segment.

* * * * *